(12) United States Patent
Kikuchi et al.

(10) Patent No.: US 8,861,948 B2
(45) Date of Patent: Oct. 14, 2014

(54) IMAGE PICKUP APPARATUS

(71) Applicant: Canon Kabushiki Kaisha, Tokyo (JP)

(72) Inventors: Takayuki Kikuchi, Utsunomiya (JP); Keisuke Hirai, Tokyo (JP); Shingo Isobe, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/790,736

(22) Filed: Mar. 8, 2013

(65) Prior Publication Data

US 2013/0188092 A1 Jul. 25, 2013

Related U.S. Application Data

(62) Division of application No. 13/110,287, filed on May 18, 2011.

(30) Foreign Application Priority Data

May 25, 2010 (JP) .................................. 2010-119306
Jun. 1, 2010 (JP) .................................. 2010-125496

(51) Int. Cl.
| | | |
|---|---|---|
| G03B 17/00 | (2006.01) |
| G03B 13/22 | (2006.01) |
| G03B 5/00 | (2006.01) |
| H04N 5/232 | (2006.01) |
| G02B 7/10 | (2006.01) |
| G03B 13/36 | (2006.01) |

(52) U.S. Cl.
CPC .............. *G03B 13/36* (2013.01); *G03B 13/22* (2013.01); *G03B 5/00* (2013.01); *H04N 5/23293* (2013.01); *G02B 7/102* (2013.01); *H04N 5/23212* (2013.01); *G03B 2205/0046* (2013.01)

USPC ............................................................ 396/80

(58) Field of Classification Search
USPC ............................................................ 396/80
See application file for complete search history.

(56) References Cited

U.S. PATENT DOCUMENTS

| | | | |
|---|---|---|---|
| 5,990,937 A * | 11/1999 | Masayoshi ...................... 348/64 |
| 5,995,765 A | 11/1999 | Kaneko et al. |
| 2002/0025152 A1 | 2/2002 | Nonaka |
| 2005/0052564 A1 | 3/2005 | Ishii |
| 2005/0110890 A1 | 5/2005 | Sasaki et al. |

(Continued)

FOREIGN PATENT DOCUMENTS

| | | |
|---|---|---|
| JP | 5-188280 A | 7/1993 |
| JP | 2006-119222 A | 5/2006 |
| JP | 2006-171290 A | 6/2006 |

*Primary Examiner* — Rochelle-Ann J Blackman
*Assistant Examiner* — Linda B Smith
(74) *Attorney, Agent, or Firm* — Rossi, Kimms & McDowell LLP

(57) ABSTRACT

An image pickup apparatus comprising: a lens apparatus having: an image pickup optical system including a focus lens unit and a zoom lens unit; a zoom state detector; and a controller; a camera apparatus having: a light receiving unit; and an image display unit; an AF frame operation unit; and a distance measuring unit installed with a parallax with respect to an optical axis of the image pickup optical system, in which the controller is configured to: select, from among measured distances obtained by the distance measuring unit, a measured distance obtained in an angle of field of the AF frame, based on a position of the zoom lens unit detected by the zoom state detector and a position of the AF frame set in the display; and perform the focusing by driving the focus lens unit based on the selected measured distance.

11 Claims, 18 Drawing Sheets

(56) References Cited

U.S. PATENT DOCUMENTS

| | | | |
|---|---|---|---|
| 2006/0109370 A1* | 5/2006 | Yamazaki | 348/345 |
| 2007/0115385 A1 | 5/2007 | Nonaka | |
| 2008/0024649 A1 | 1/2008 | Okawara | |
| 2008/0025715 A1* | 1/2008 | Ishii | 396/105 |
| 2009/0138233 A1 | 5/2009 | Kludas et al. | |
| 2010/0165101 A1 | 7/2010 | Kludas et al. | |
| 2011/0013073 A1* | 1/2011 | Okawara | 348/345 |
| 2011/0293255 A1 | 12/2011 | Kikuchi et al. | |

* cited by examiner

IMAGE PICKUP APPARATUS

BACKGROUND OF THE INVENTION

1. Field of the Invention

The present invention relates to an autofocus (hereinbelow, referred to as AF) image pickup apparatus provided with a distance measuring function having a parallax with respect to an image pickup optical system.

The present invention also relates to an AF lens apparatus which is detachable/attachable from/to a camera.

2. Description of the Related Art

Conventionally, as an autofocus technology, there has been used external distance measure type autofocus (external distance measuring AF), which employs infrared triangulation distance measurement or pupil division phase differential detection. With the external distance measuring AF, a distance can be measured directly, and thus a scanning operation or a hill-climbing operation is not required in determining the position of an in-focus point, which is necessary for video AF. Hence, the external distance measuring AF has a feature in which an in-focus state can be achieved at high speed. On the other hand, there are some drawbacks, such as a parallax which occurs between a taken image and a distance measuring area depending on an object distance, and the distance measuring area being fixed.

The following countermeasures have been proposed against such problems as described above, that is, the parallax and the limitation on the distance measuring area.

In order to overcome the parallax problem, Japanese Patent Application Laid-Open No. 2006-171290 discloses a technology of correcting a parallax by using the shake correction optical system provided to the image pickup optical system.

Japanese Patent Application Laid-Open No. 2006-119222 proposes the image pickup apparatus, which includes multiple object distance detectors and refers to the focal length of the zoom lens to calculate the object distance from the distance information obtained from the multiple object distance detectors. For each of the multiple object distance detectors, a different angle of view is determined so that the distance to an object can be measured (distance measuring) without being affected by the parallax in a given focal length range.

Japanese Patent Application Laid-Open No. H05-188280 discloses a technology of rotating the external distance measuring mechanism according to the angle of field for image taking so as to widen the distance measuring range.

Further, Japanese Patent Application Laid-Open No. H05-188280 proposes the camera which includes the driving unit for rotating the object distance detector and changes its rotation range according to the angle of field for image taking. However, in Japanese Patent Application Laid-Open No. 2006-171290, the optical axis direction of the image taking optical system is changed to correct the parallax, which is suitable for taking a still image, but there is no disclosure about an operation at the time of taking a moving image. In the technology disclosed in Japanese Patent Application Laid-Open No. 2006-119222, the multiple object distance detectors are provided and arranged by varying the angle of view. However, in order to suppress the influence of parallax in finely-divided focal length ranges, a large number of object distance detectors are necessary, resulting in complex configuration and control. In addition, there is no specific disclosure about its arrangement. Further, in Japanese Patent Application Laid-Open No. H05-188280, the distance to the object is measured in the entire angle of field for image taking, and accordingly, a camera operator cannot predict which position is to be focused in the image-taking range. This technology is suitable as the AF used when an ordinary camera operator takes an image. However, there is a problem that such technology is not practical as the AF used when a professional camera operator takes an image for the purpose of, for example, broadcasting, because the system does not allow the camera operator to perform the AF operation with respect to a position specified by the camera operator. In Japanese Patent Application Laid-Open No. H05-188280, the rotation range of the object distance detector is changed according to the angle of field for image taking. However, continuous distance measurement is performed in the angle of field for image taking, and hence it takes time to obtain distance measurement information.

In view of the above, an exemplary object of the present invention is to provide an optical apparatus capable of measuring a distance to an object with a wide focus area. The optical apparatus sets an angle between an optical axis of an image pickup optical system and an optical axis of an external distance measuring sensor appropriately according to a focal length of the image pickup optical system, shifts a distance measuring direction toward an AF execution position specified by an camera operator, and performs distance measurement with respect to the AF execution position, thereby performing an AF operation.

SUMMARY OF THE INVENTION

In order to achieve the above-mentioned object, according to one aspect of the present invention, there is provided an image pickup apparatus comprising: a lens apparatus having: an image pickup optical system including a focus lens unit and a zoom lens unit; a zoom state detector for detecting a position of the zoom lens unit; and a controller for controlling to drive the image pickup optical system; a camera apparatus having: a light receiving unit for receiving a beam from the image pickup optical system; and an image display unit for displaying image information obtained by the light receiving unit; an AF frame operation unit for setting, as an AF frame, a range for performing focusing in a display of the image display unit; and a distance measuring unit installed with a parallax with respect to an optical axis of the image pickup optical system, for measuring a distance to an object, in which the controller is configured to: select, from among measured distances obtained by the distance measuring unit, a measured distance obtained in an angle of field of the AF frame, based on the position of the zoom lens unit detected by the zoom state detector and a position of the AF frame set in the display; and perform the focusing by driving the focus lens unit based on the selected measured distance.

According to another aspect of the present invention, there is provided an image pickup apparatus including: a lens apparatus including: an image pickup optical system including a focus lens unit and a zoom lens unit; a zoom state detector for detecting a position of the zoom lens unit; and a controller for controlling driving of the image pickup optical system; a camera apparatus including: a light receiving unit for receiving a beam from the image pickup optical system; and an image display unit for displaying image information obtained by the light receiving unit; an AF frame operation unit for setting, as an AF frame, a range for performing focusing in a display of the image display unit; a distance measuring unit installed with a parallax with respect to an optical axis of the image pickup optical system, for measuring a distance to an object; and a distance measuring optical axis changing unit for changing an optical axis direction of the distance measuring unit in an optical axis plane including the optical axis of the image pickup optical system and an optical axis of the distance measuring unit, in which the controller is configured to: set an angle of the optical axis of the distance measuring unit with respect to the optical axis of the image pickup optical system based on the position of the zoom lens unit detected by the zoom state detector and a position of the AF frame set in the display; and control the distance measuring optical axis changing unit to change the optical axis direction of the distance measuring unit.

According to the present invention, it is possible to provide the optical apparatus capable of measuring a distance to an object with a wide focus area by setting the angle between the optical axis of the image pickup optical system and the optical axis of the external distance measuring sensor appropriately according to the focal length of the image pickup optical system to suppress the influence of the parallax of the external distance measuring sensor.

The AF can be performed with respect to a target object in the range of the AF frame set arbitrarily by the image taker.

Further features of the present invention will become apparent from the following description of exemplary embodiments with reference to the attached drawings.

DESCRIPTION OF THE EMBODIMENTS

Hereinbelow, embodiments of the present invention are described in detail with reference to the attached drawings.

First Embodiment

Figure 1A:
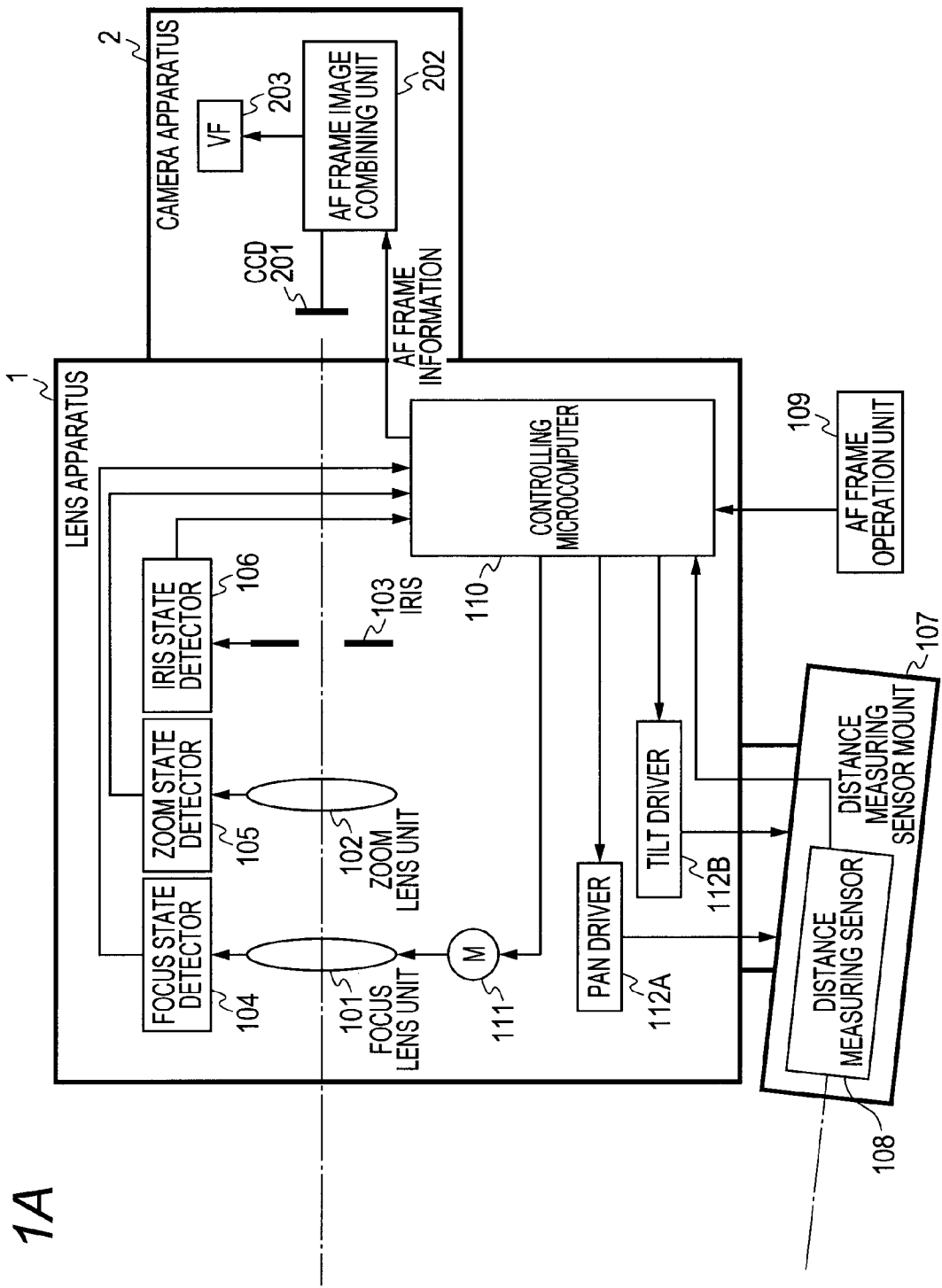
FIG. 1A is a block configuration diagram according to a first embodiment.
Figure 1B:
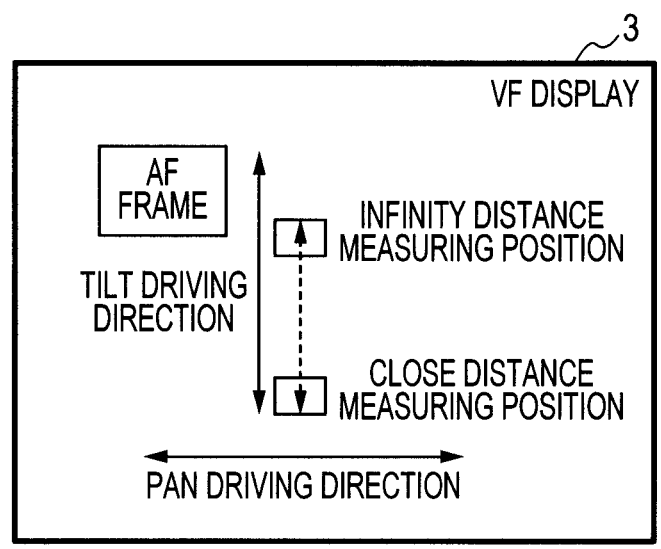
FIG. 1B is a conceptual diagram of a display according to the first embodiment.
Figure 2:
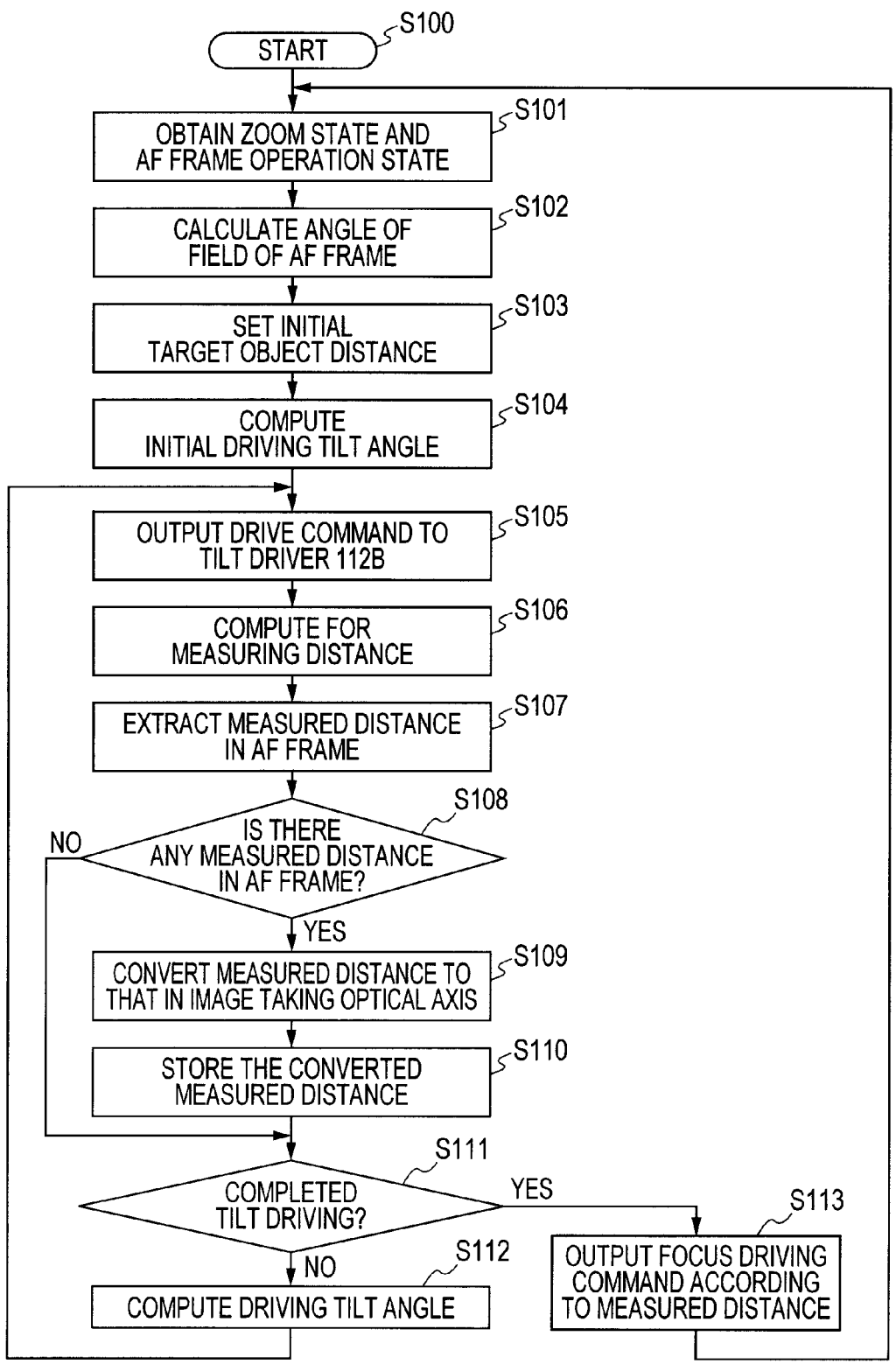
FIG. 2 is an operation flow chart according to the first embodiment.

A first embodiment of the present invention is described with FIG. 1A (a block configuration diagram of an image pickup apparatus representing a feature of the embodiment) and FIG. 1B (a conceptual diagram of a display of the embodiment).

FIG. 1A illustrates a lens apparatus 1 and a camera apparatus 2 which is detachable/attachable from/to the lens apparatus 1.

The lens apparatus 1 includes a focus lens unit (focus lens) 101 used for focusing of the lens apparatus 1, a zoom lens unit (zoom lens) 102 used for zooming of the lens apparatus 1, and an iris mechanism 103 for adjusting a stop of the lens apparatus 1.

The position of the focus lens unit 101 is detected by a focus state detector 104, which is a focus position detector constituted by a potentiometer or an encoder. A zoom state detector 105, which is a zoom position detector (a zoom state detector), detects the position (state) of the zoom lens unit 102 in the same manner, and an iris state detector 106 detects the state of the iris mechanism 103. Here, the zoom position (zoom state) indicates any of a focal length of whole system of the lens apparatus or a position of the lens unit (zoom lens unit, magnification lens unit) which moves during zooming (magnification-varying) of the lens apparatus.

The lens apparatus 1 includes a distance measuring sensor 108 and an AF frame operation unit 109. The distance measuring sensor 108 is a distance measuring unit for external distance measuring AF which employs, for example, infrared triangulation distance measurement or pupil division phase differential detection, and is installed in a distance measuring sensor mount 107, which is a distance measuring direction changing unit having structure capable of changing an optical axis direction. The AF frame operation unit 109 is used by a camera operator in setting an AF frame.

Further, the lens apparatus 1 includes a controlling microcomputer 110, which is a controller for controlling the lens apparatus 1, and a focus motor 111 for changing, through electrical operation, the position of the focus lens unit 101 in response to a command signal from the controlling microcomputer 110.

Further, the lens apparatus 1 includes a pan driver 112A and a tilt driver 112B for driving the distance measuring sensor mount 107 in a pan direction and in a tilt direction, respectively, in response to command signals from the controlling microcomputer 110.

On the other hand, the camera apparatus 2 includes a CCD (light receiving unit) 201 and an AF frame image combining unit 202. The CCD 201 receives beams coming from an object to obtain information on an image formed by the lens apparatus 1, and then performs photoelectric conversion to obtain an image signal. The AF frame image combining unit 202 combines the image signal from the CCD 201 and AF frame information provided by the controlling microcomputer 110 of the lens apparatus 1. Then, an electronic viewfinder (hereinbelow, referred to as VF) (image display unit) 203 displays an image signal which is information on an image having the AF frame combined therewith by the AF frame image combining unit 202.

FIG. 1B illustrates a display image 3 of the VF 203. FIG. 1B also illustrates distance measuring positions of the distance measuring sensor 108, which are not actually displayed in the display image 3. It is assumed that the distance measuring sensor of FIG. 1A is disposed below the optical axis of the image pickup optical system. Accordingly, in consideration of a parallax, as to the distance measuring position, the distance measuring sensor 108 simultaneously performs distance measurement with respect to a lower part of the display in the case of close distance and an upper part of the display in the case of infinity distance, as illustrated in the display image 3.

On the other hand, the camera operator operates the AF frame operation unit 109, to thereby move the AF frame, which is displayed in the display of the VF 203 and specifies a position to be subjected to auto focusing, to a position in the display specified by the camera operator. Note that, position and shape including size of the AF frame can be changed, using the AF frame operation unit 109.

In order to make the angle of field of the distance measuring sensor 108 coincident with the AF frame specified by the camera operator, the pan driver 112A and the tilt driver 112B drive the distance measuring sensor mount 107 in a lateral direction of the display and a longitudinal direction of the display, respectively. Note that, the driving in the pan direction and the tilt direction does not need setting precisely in the longitudinal and lateral directions, but only needs to be driven in two different directions each perpendicular to the optical axis (preferably, two directions orthogonal to each other). Further, drivers which allow driving in more than two directions may be provided. In other words, any unit may be employed as long as the unit allows the angle of field for distance measuring of the distance measuring sensor 108 to be shifted within the angle of field of the image pickup optical system. Further, in this embodiment, the optical axis direction of the distance measuring sensor 108 is changed with respect to the optical axis of the optical system of the lens apparatus 1 by subjecting the distance measuring sensor 108 itself to mechanical pan and tilt operations, but the present invention is not limited thereto. The optical system of the distance measuring sensor 108 may be provided with structure capable of optically changing its optical axis direction.

Figure 3:
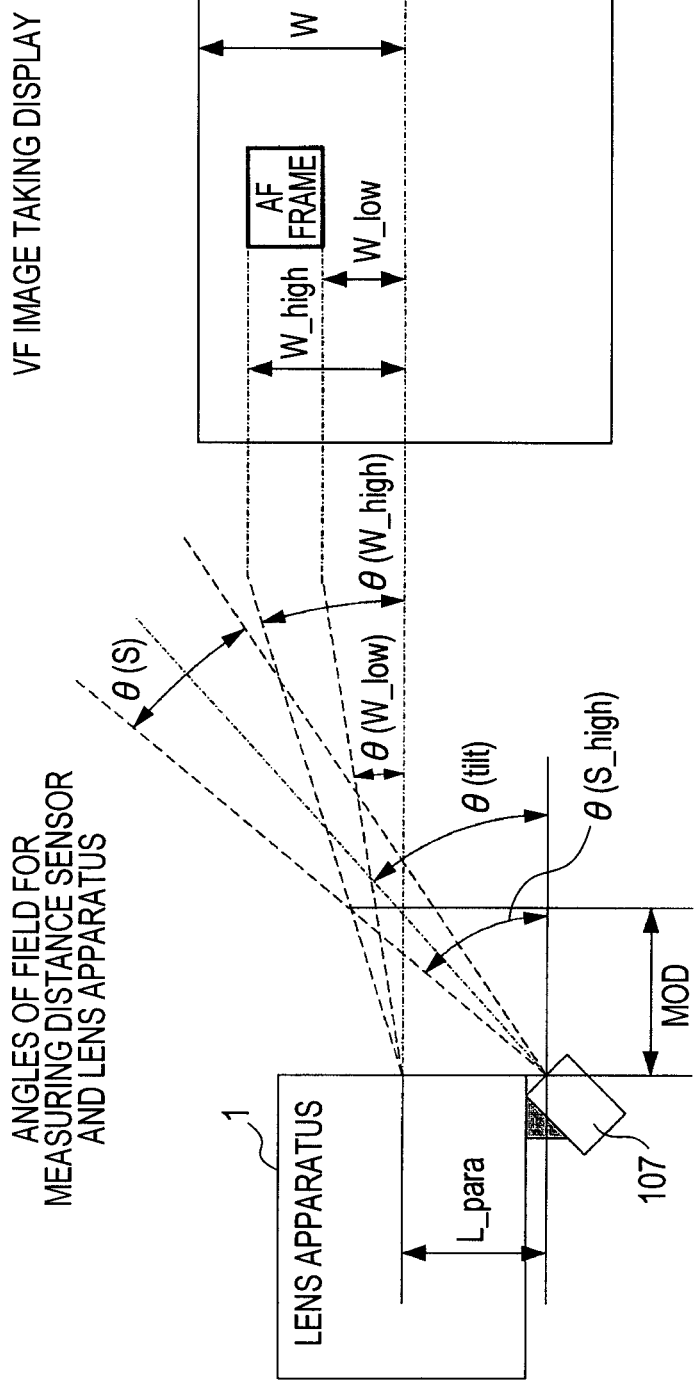
FIGS. 3A and 3B are conceptual diagrams illustrating an angle of field of an image pickup apparatus and an angle of field of a distance measuring sensor.

Hereinafter, an operation of driving the distance measuring sensor 108 in a direction toward the AF frame is described with reference to FIGS. 2 to 5 for this embodiment. Note that, it is assumed, as a precondition for description, that the distance measuring sensor mount 107 is disposed below the image pickup optical system as illustrated in FIG. 3A, and that the AF frame is set through an operation by the camera operator to such position and size as illustrated in FIG. 3B. It is also assumed that the VF 203 displays a taken image and the AF frame combined therewith by the AF frame image combining unit 202 which receives an AF frame position and size information output from the controlling microcomputer 110 of the lens apparatus 1. Note that, the tilt direction of the distance measuring sensor mount 107 is mainly described, but the same control as in the tilt direction is possible for the pan direction.

Processing starts in S100, and then proceeds to S101. In S101, the lens apparatus 1 obtains zoom state information (particularly, the position of the zoom lens unit) of the zoom state detector 105 and an operation state (particularly, the position and the size of the AF frame in the display) of the AF frame operation unit 109. Then, in S102, the lens apparatus 1 calculates the angle of field of the AF frame with respect to the angle of field for image pickup. The calculation in S102 is as follows:

$$\theta(W\_high) = \arctan(y/2f) \times W\_high/W \quad (1)$$

$$\theta(W\_low) = \arctan(y/2f) \times W\_low/W \quad (2)$$

where the respective variables are as follows.

θ(W_high): an angle formed between the optical axis of the image pickup apparatus and an upper limit of the AF frame θ(W_low): an angle formed between the optical axis of the image pickup apparatus and a lower limit of the AF frame y: a CCD image size in vertical direction of the camera apparatus 2 f: a focal length derived from the zoom state of the lens apparatus 1

W: a half angle of field in vertical direction for image taking

W_high: an angle of field formed between the optical axis and the upper limit of the AF frame W_low: an angle of field formed between the optical axis and the lower limit of the AF frame Subsequently, in S103, an initial target object distance is set for subsequent computation. In this flow, a minimum object distance (MOD) of the image pickup system is set as the initial setting, and then, the optical axis direction of the distance measuring sensor is sequentially changed from the close side toward the infinity side of the lens apparatus. Specifically, the optical axis direction of the distance measuring sensor is changed in a manner that an area in the angle of field of the AF frame, in which the distance measuring sensor 108 can perform the distance measurement (an area in which the angle of field of the distance measuring sensor 108 overlaps the angle of field of the AF frame (hereinafter, referred to as overlapping area)), is changed from the close side toward the infinity side of the lens apparatus. In this case, the MOD is set as an initial value, but the infinity or an arbitrary object distance may be set as the initial value. Alternatively, by detecting the state of the focus state detector 104, the object distance at a current focus position may be set.

Then, in S104, a target tilt angle of the distance measuring sensor mount 107 is computed. In this computation, a target tilt angle θ(tilt) is computed so that the object distance at which the angle θ(W_high) of the upper limit of the AF frame calculated in S102 intersects an angle θ(S_high) of the upper limit of the distance measuring sensor becomes the distance set in S103:

$$T(W\_high) = MOD \times \tan(\theta(W\_high)) \quad (3)$$

$$\theta(S\_high) = \arctan((T(W\_high) + L\_para)/MOD) \quad (4)$$

$$\theta(tilt) = \theta(S\_high) - \theta(S)/2 \quad (5)$$

where the variables are as follows:

T(W_high): a distance from the image-taking optical axis to an intersection point of the angle of field of the upper limit of the AF frame and the upper limit of the angle of field of the distance measuring sensor.

L_para: a parallax distance between the image pickup optical system and the distance measuring sensor θ(S_high): an angle between the image-taking optical axis and the upper limit of the angle of field of the distance measuring sensor θ(S): the angle of field of the distance measuring sensor In this manner, the target tilt angle θ(tilt) is set so that the object distance at which the angle of field of the upper limit of the AF frame θ(W_high) intersects the angle of field of the upper limit of the distance measuring sensor θ(S_high)

becomes the MOD, and the scanning is performed in such a manner as to decrease the target tilt angle θ(tilt). Hence, the distance measurement can be performed without fail with respect to an object in the AF frame, which is positioned farther than the MOD. In S105, a tilt drive command is output to the tilt driver 112B so that the optical axis of the distance measuring sensor 108 is shifted to achieve the determined target tilt angle. Then, the distance measurement is performed in S106.

Figure 4:
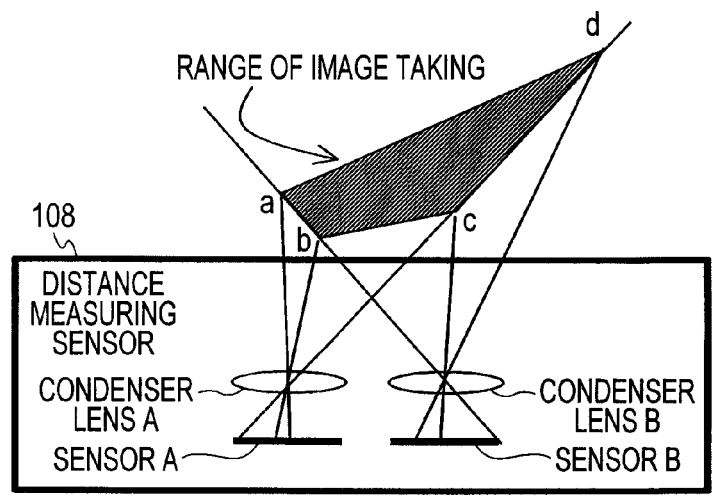
FIG. 4 is a conceptual diagram of triangulation distance measurement performed by the distance measuring sensor.

Then, in S107, the object in the AF frame is extracted based on a result of the distance measurement obtained in S106. FIG. 4 illustrates positions at which images of the object are formed in the distance measuring sensor 108 employing the pupil division phase differential detection. Beams from the objects, which pass through the centers of condenser lenses A and B, are projected to sensors A and B to form the images, and, based on an image displacement amount and imaged positions on the sensors A and B, depth information (a position in a direction away from the sensors) and width information (a position in an alignment direction of the sensors A and B) of the objects can be determined. Further, in FIG. 4, the hatched portion indicates a part (overlapping area) in which the angle of field of the AF frame overlaps the angle of field of the distance measuring sensor (the angle of field in which the sensors A and B can perform the distance measurement). In S108, based on the image displacement amount and the imaged positions on the sensors A and B, the controlling microcomputer 110 determines whether or not the object for which the distance measurement has been performed is included in an area surrounded by coordinates of intersection points (a, b, c and d). When the object is present in the AF frame (when the object is present in the overlapping area), the processing proceeds to S109, in which the measured distance is converted to a distance in the optical axis direction of the image pickup optical system, and in S110, the converted measured distance is stored.

After the processing of S110 is finished, or when the determination is "No" in S108, the processing proceeds to S111. In S111, it is determined whether or not the distance measuring sensor mount 107 is to be driven to set a subsequent angle of field for distance measuring. As for a determination condition, the driving control may be finished when the result of the distance measurement has been obtained in the AF frame in the determination of S108, or the driving and the distance measuring processing may be performed until the angle of field for distance measuring reaches the infinity position in the angle of field of the AF frame. Alternatively, the processing may be finished when the tilt driving is performed to a position beyond the distance measuring capability of the distance measuring sensor, that is, when the tilt driving is performed to a position beyond a detectable object distance. Further, the processing may be finished when the tilt driving is performed for distance measurement beyond an object distance at which the result of the distance measurement becomes less accurate than within the depth of field of the image taking optical system.

In the case where the determination is "No" in S111, that is, when processing of driving the distance measuring sensor mount 107 again and performing the distance measurement for an unmeasured portion in the angle of field of the AF frame is selected, the target tilt angle θ(tilt) of the distance measuring sensor mount 107 is computed in S112 as an assignment operation:

$$\theta(tilt) = \theta(tilt) - \theta(S) \tag{6}$$

Figure 5:
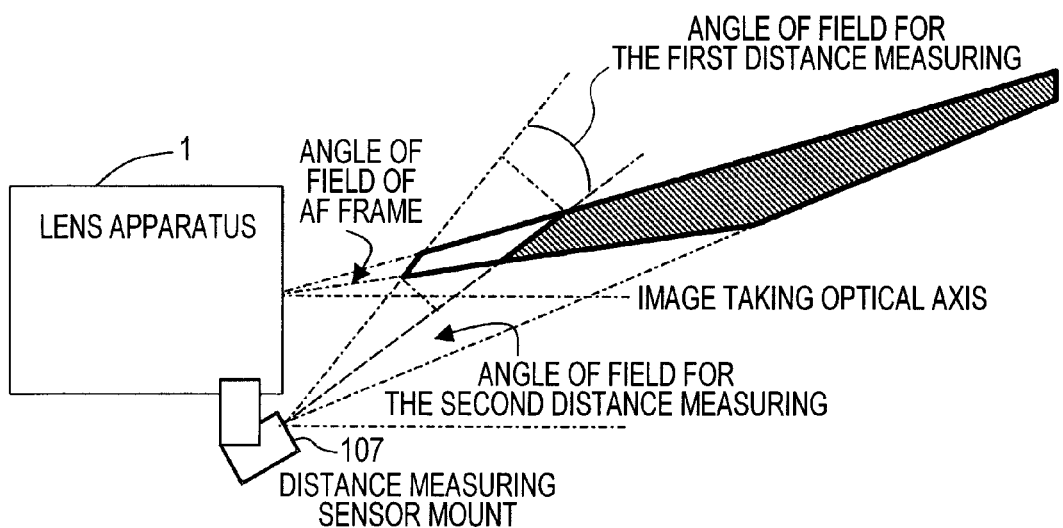
FIG. 5 is a conceptual diagram of scanning distance measurement.

Specifically, as in FIG. 5, the angle of field for distance measuring is set so that the lower limit of the current angle of field for distance measuring is coincident with the upper limit of the subsequent angle of field for distance measuring.

Apart from the above, to give another target tilt angle setting method, for preventing a target of distance measurement from being missed, an adjacent area of the upper limit of the subsequent angle of field for distance measuring may slightly overlap with an adjacent area of the lower limit of the current angle of field for distance measuring. Further, when a target object is present in an adjacent area of an edge of the angle of field for distance measuring as a result of the current distance measurement, the subsequent target tilt angle may be controlled so that the object in the adjacent area is captured at the center of the angle of field for the subsequent distance measuring.

After the computation of the target tilt angle, the processing returns to S105, in which a driving command is output to the tilt driver 112B. Then, the scanning operation is performed for the object distance measurement in the AF frame.

Further, in case it is determined that the tilt driving has been finished in S111, the processing proceeds to S113. In S111, of the results of the distance measurement stored in S110, an optimum result is output as a focus driving command to the focus motor 111, thereby performing processing of the AF operation. The optimum measured distance described here may be obtained as follows. That is, for example, when there are obtained multiple measured distances, the controlling microcomputer (object distance calculating unit) 110 calculates the object distance based on the position of the focus lens unit detected by the focus state detector 104, and selects a measured distance close to the object distance from among the multiple measured distances. With this configuration, an in-focus state is maintained with respect to the object for which an in-focus state is achieved by the previous AF operation. In other words, the AF processing can be continued with respect to the same object. Alternatively, a value near the previously-selected measured distance may be selected, or a distance-measured point close to a measured-position in the previously-selected AF frame may be selected. Further, a measured distance obtained at a position close to the center of the AF frame may be selected.

Further, in this embodiment, a passive-type external light phase difference sensor is described as the distance measuring sensor, but the present invention is also applicable to active-type infrared triangulation distance measurement. Further, as the method of changing the angle of field for distance measuring (the optical axis direction of the distance measuring sensor), in this embodiment, the angle of field for distance measuring is changed by mechanically driving the distance measuring sensor mount 107 in the pan direction and in the tilt direction. However, this may be realized by providing structure capable of optically changing the optical axis direction, such as disposing a variable apex angle prism or a mirror in the optical system of the distance measuring sensor.

The above-mentioned configuration enables such AF that uses a measured distance obtained in a range determined based on the position and the size of the AF frame set by the camera operator.

Note that, the description above is given with regard to the tilt control, but, by performing the same processing for the pan direction as well, the distance measurement can be performed with respect to the AF frame position specified by the camera operator.

Second Embodiment

Figure 6:
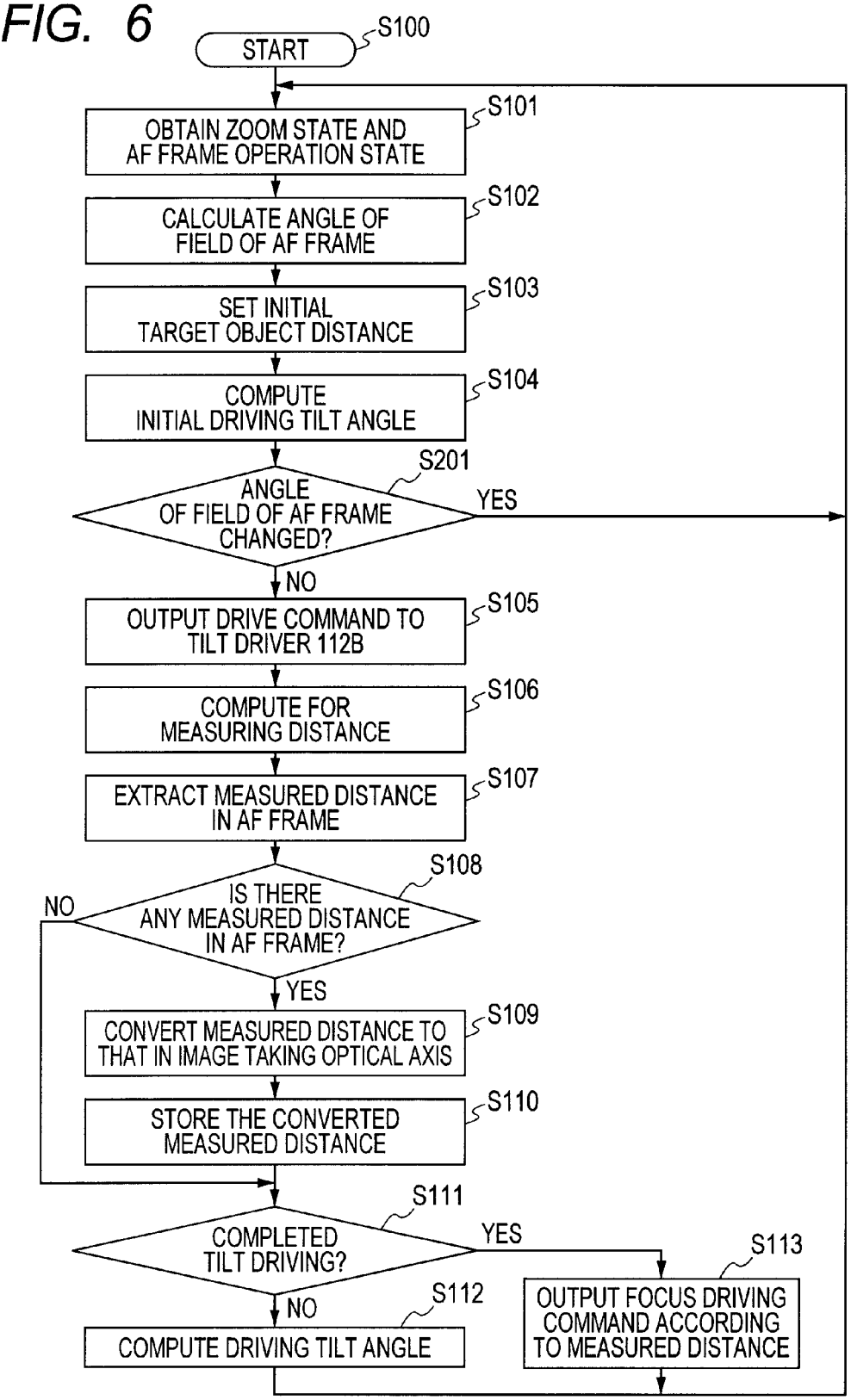
FIG. 6 is an operation flow chart according to a second embodiment.

FIG. 6 is a flow chart of processing performed by the controlling microcomputer 110 of the lens apparatus 1, which represents a feature of a second embodiment of the present invention. Note that, the same processing steps as those of FIG. 2 of the first embodiment are denoted by the same step numbers, and thus description thereof is herein omitted.

The feature of this embodiment is that: it is determined in S201 whether or not a change in angle of field of the AF frame occurs due to a change in zoom state or AF frame operation state; when a change in angle of field of the AF frame occurs, the distance measuring operation is stopped; and the scanning distance measurement is not performed until the angle of field of the AF frame stops changing. After the angle of field of the AF frame stops changing, the angle of field for distance measuring is set to the initial position as described in the first embodiment, and then, the scanning distance measurement is performed.

With the above-mentioned configuration, the distance measuring operation can be performed under a new condition at the time of the zooming operation or the AF frame operation, with the result that the AF operation can be performed accurately.

Third Embodiment

Figure 7:
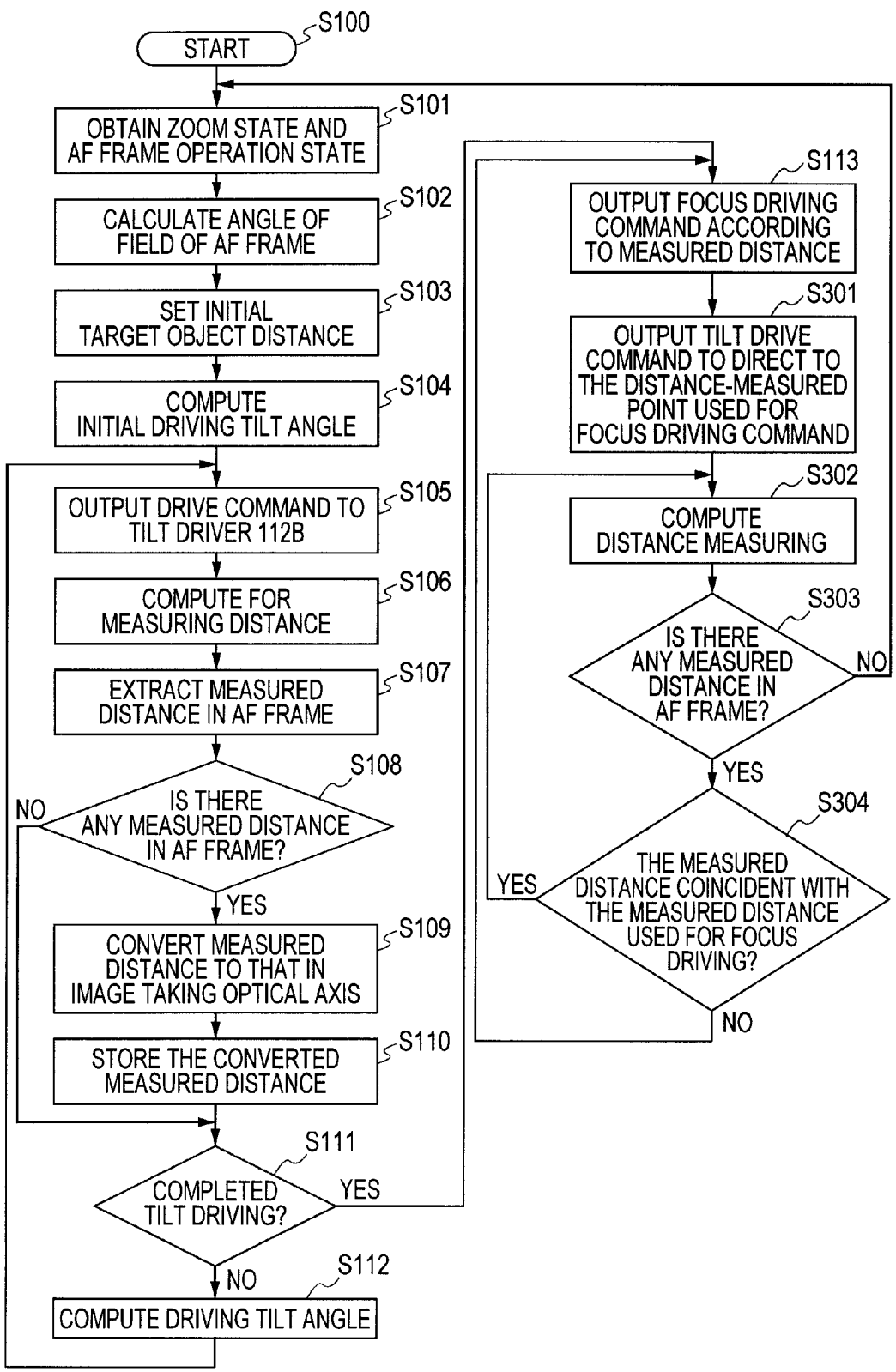
FIG. 7 is an operation flow chart according to a third embodiment.

FIG. 7 is a flow chart of processing performed by the controlling microcomputer 110 of the lens apparatus 1, which represents a feature of a third embodiment of the present invention. Note that, the same processing steps as those of FIG. 2 of the first embodiment and FIG. 6 of the second embodiment are denoted by the same step numbers, and thus description thereof is herein omitted.

The feature of this embodiment is that after the AF is performed, the distance measuring sensor mount 107 is controlled so that the distance measuring sensor 108 keeps monitoring the object which is the target of the AF.

After the AF is performed in S113 of FIG. 7, the tilt driving command is output to move the distance measuring sensor mount 107 in S301 so that the optical axis of the distance measuring sensor 108 is directed to a direction toward the object for which the measured distance used for focus driving in S113 has been obtained. Then, in S302, the distance measurement computation is performed again using the distance measuring optical axis thus set. In S303, it is determined whether or not there is any measured distance (object) in the area in which the angle of field of the distance measuring sensor 108 overlaps the angle of field set by means of the AF frame (overlapping area), based on the respective angles of field and the measured distance and information on the imaged positions, the displacement amount, and the like in the line sensor of the distance measuring sensor. When there is no measured distance, the processing returns to S101 to perform the series of steps of the distance measuring operation again. On the other hand, when it is determined in S303 that there is a measured distance (object) in the overlapping area, it is further determined in S304 whether or not the measured distance is coincident with the measured distance used for the focus driving. When the measured distances are not coincident with each other, the processing returns to S113 for the focus driving. On the other hand, when it is determined in S304 that the measured distance is coincident with the measured distance used for the focus driving, the processing returns to S302 to repeat the distance measuring operation.

Note that, in the tilt driving of S301, the control may be performed so as to cause the distance-measured point used at the time of the AF to be coincident with the distance measuring optical axis, or so as to set the tilt angle to an angle used for the scanning before the AF is executed.

Further, when it is determined in S303 that the object does not exist any more, the scanning distance measurement may be performed from a range close to the measured distance used for the AF.

Fourth Embodiment

Figure 8:
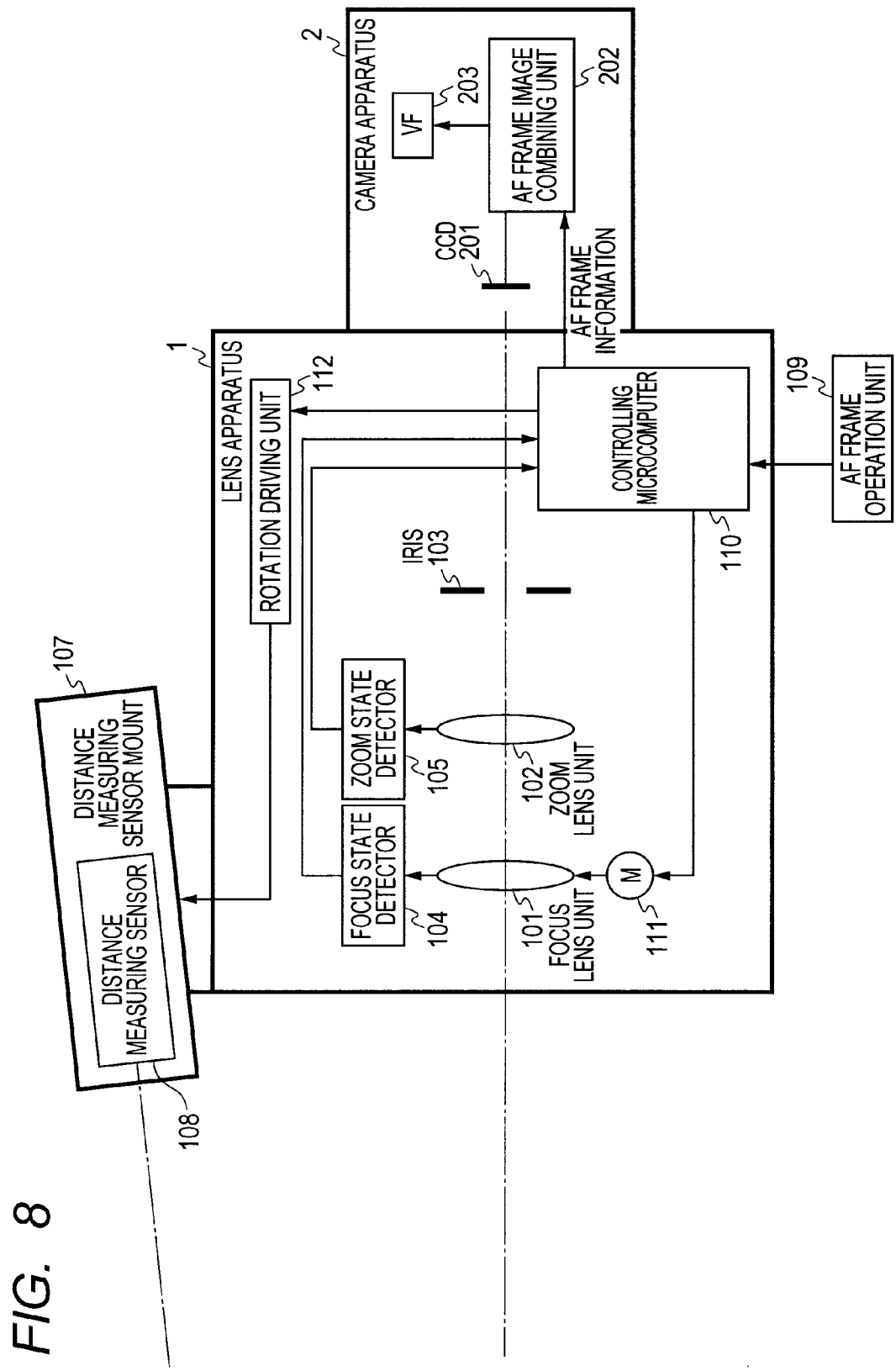
FIG. 8 is a schematic configuration according to a fourth embodiment.

FIG. 8 is a diagram illustrating a schematic configuration of an image pickup apparatus according to a fourth embodiment of the present invention.

The image pickup apparatus according to the fourth embodiment includes a lens apparatus 1 and a camera apparatus 2 which is detachable/attachable from/to the lens apparatus 1 or is integrated with the lens apparatus 1.

The lens apparatus 1 includes: an image pickup optical system including a focus lens unit 101 used for focusing, a zoom lens unit 102 used for zooming, and an iris mechanism 103 being an aperture stop for adjusting a stop; a focus state detector 104 for detecting the state of the focus lens unit 101; and a zoom state detector 105 for detecting the state of the zoom lens unit 102. The focus state detector 104 and the zoom state detector 105 are each constituted by a potentiometer, an encoder or the like.

A distance measuring sensor 108 of external distance measure type, which employs the infrared triangulation distance measurement or the pupil division phase differential detection, is a distance measuring unit for measuring a distance (ranging) to an object, and is installed on a distance measuring sensor mount 107 being a distance measuring optical axis changing unit having rotatable structure. Specifically, the distance measuring sensor 108 is installed with a parallax with respect to the image taking optical system. By using an AF frame operation unit 109, a camera operator can set, as an AF frame, an area for which the camera operator desires to perform autofocusing (AF). The lens apparatus 1 is controlled by a controlling microcomputer 110. The state (position) of the focus lens unit 101 is changed by a focus motor 111 based on a command signal from the controlling microcomputer 110. Further, the distance measuring sensor mount 107 is rotated by a rotation driving unit 112 based on a command signal from the controlling microcomputer 110.

On the other hand, in the camera apparatus 2, beams from an object pass through the lens apparatus 1 to form an image on a CCD 201 serving as a light receiving unit, and are then subjected to photoelectric conversion to obtain an image signal as image information. An AF frame image combining unit 202 combines the image signal from the CCD 201 and AF frame information provided from the controlling microcomputer 110 of the lens apparatus 1. Then, the image signal having the AF frame combined therewith by the AF frame image combining unit 202 is displayed in an electronic viewfinder (hereinbelow, referred to as VF) 203, which is an image display unit.

Figure 9:
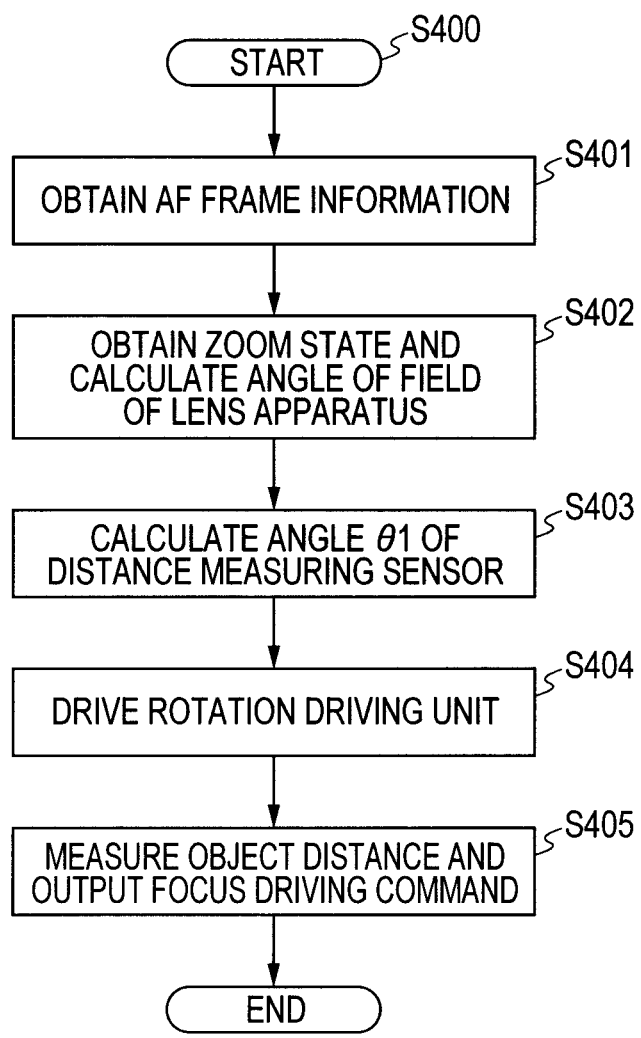
FIG. 9 is an operation flow chart according to the fourth embodiment.

Hereinafter, a method of determining an optical axis direction of the distance measuring sensor 108 for measuring a distance to an object in the AF frame set at a predetermined position in the VF 203 is described with reference to a flow chart of FIG. 9. Note that, the AF frame is placed by the camera operator at a position illustrated in FIG. 10, and the AF frame is displayed in the VF 203 where the AF frame is combined with the taken image by the AF frame image combining unit 202 based on the taken image and the AF frame position output from the controlling microcomputer 110 of the lens apparatus 1.

At first, in S401, the lens apparatus 1 obtains AF frame information from the controlling microcomputer 110. The AF frame information here refers to information which indicates where the boundaries of the AF frame are positioned in the VF 203.

Subsequently, in S402, a half angle of field of the lens apparatus 1 is calculated based on zoom state information of the zoom state detector 105. The calculation of S402 is as follows:

$$\alpha = \arctan(y/2f) \quad (7)$$

where the variables are as follows:
α: a half angle of field of the lens apparatus 1
y: a CCD image size in vertical direction of the camera apparatus 2
f: a focal length of the lens apparatus 1

Subsequently, in S403, an angle θ formed between the optical axis of the distance measuring sensor 108 and the optical axis of the lens apparatus 1 is calculated by Expression (8) below:

$$\tan(\theta+\beta) = -s \times \tan(\alpha) \quad (8)$$

where β represents the half angle of field of the distance measuring sensor 108, and s represents a variable indicating, in a plane including the optical axis of the lens apparatus 1 and the optical axis of the distance measuring sensor 108 (hereinbelow, referred to as optical axis plane), a ratio representing a boundary position of the AF frame with respect to a position in the display of the VF 203 corresponding to a maximum image height. Here, the plane may be a plane which is parallel to the optical axis of the lens apparatus 1 and includes the optical axis of the distance measuring sensor 108. In this specification, the plane also includes the optical axis of the lens apparatus 1 and the optical axis of the distance measuring sensor 108 in the state above. Furthermore, in the state above, the angle between the two axes is an angle between the optical axis of the distance measuring sensor 108 in the plane and a line which is made by projecting the optical axis of the lens apparatus 1 on the plane.

In S404, a command for driving the rotation driving unit 112 is output so that the angle formed between the optical axis of the distance measuring sensor 108 and the optical axis of the lens apparatus 1 becomes θ. In S405, an object distance is measured by the distance measuring sensor 108, and the result of the distance measurement by the distance measuring sensor 108 is output as a focus driving command to the focus motor 111, thereby performing a focusing operation.

Hereinafter, the variable s used in Expression (8) is described. Here, for the convenience of description, as in FIG. 8, it is assumed that the distance measuring sensor mount is disposed above the image pickup optical system.

Figure 10:
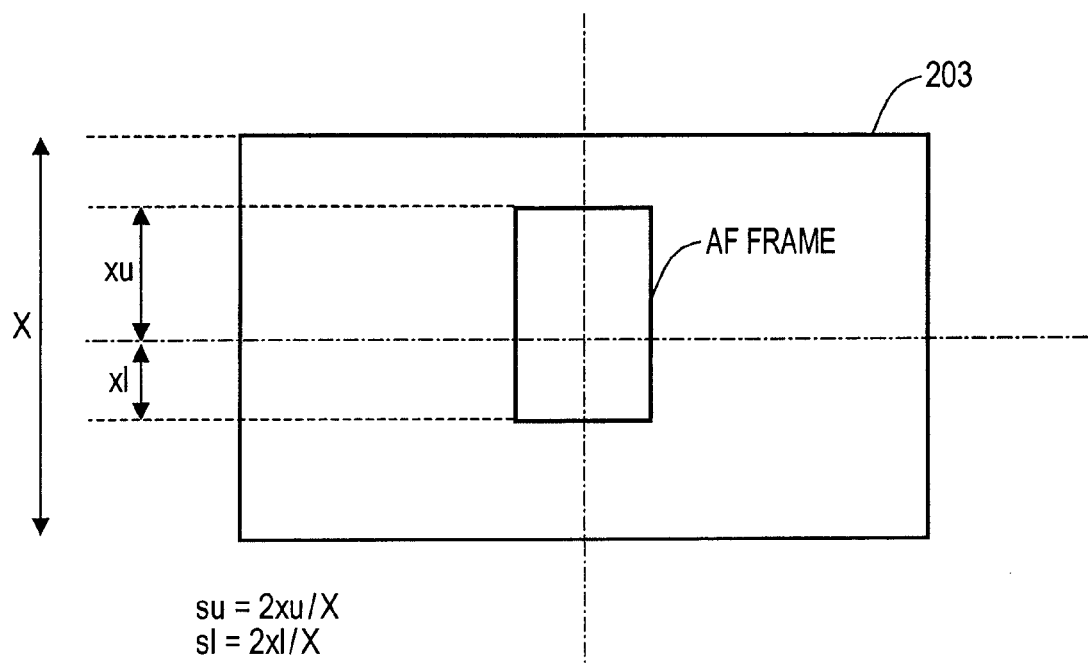
FIG. 10 is a conceptual diagram of an electronic viewfinder and an AF frame.

As illustrated in FIG. 10, the variable s is defined, in the optical axis plane including the optical axis of the lens apparatus 1 and the optical axis of the distance measuring sensor 108, as a ratio su (=2×xu/X) representing the upper limit position of the AF frame set in the display of the VF 203 with respect to the position in the display of the VF 203 corresponding to the maximum image height, or a ratio sl (=2×xl/X) representing the lower limit position of the AF frame with respect to the position in the display of the VF 203 corresponding to the maximum image height. Note that, X represents the length of the VF 203 in the vertical direction, xu represents a distance from the center of the VF 203 to the upper limit of the AF frame, and xl represents a distance from the center of the VF 203 to the lower limit of the AF frame. Further, xu and xl respectively representing the positions of the upper limit and the lower limit of the AF frame take a positive value when positioned above the center of the VF 203 and a negative value when positioned below the center of the VF 203.

Hereinafter, the derivation of Expression (8) is described with reference to FIGS. 11, 12 and 13.

Figure 11:
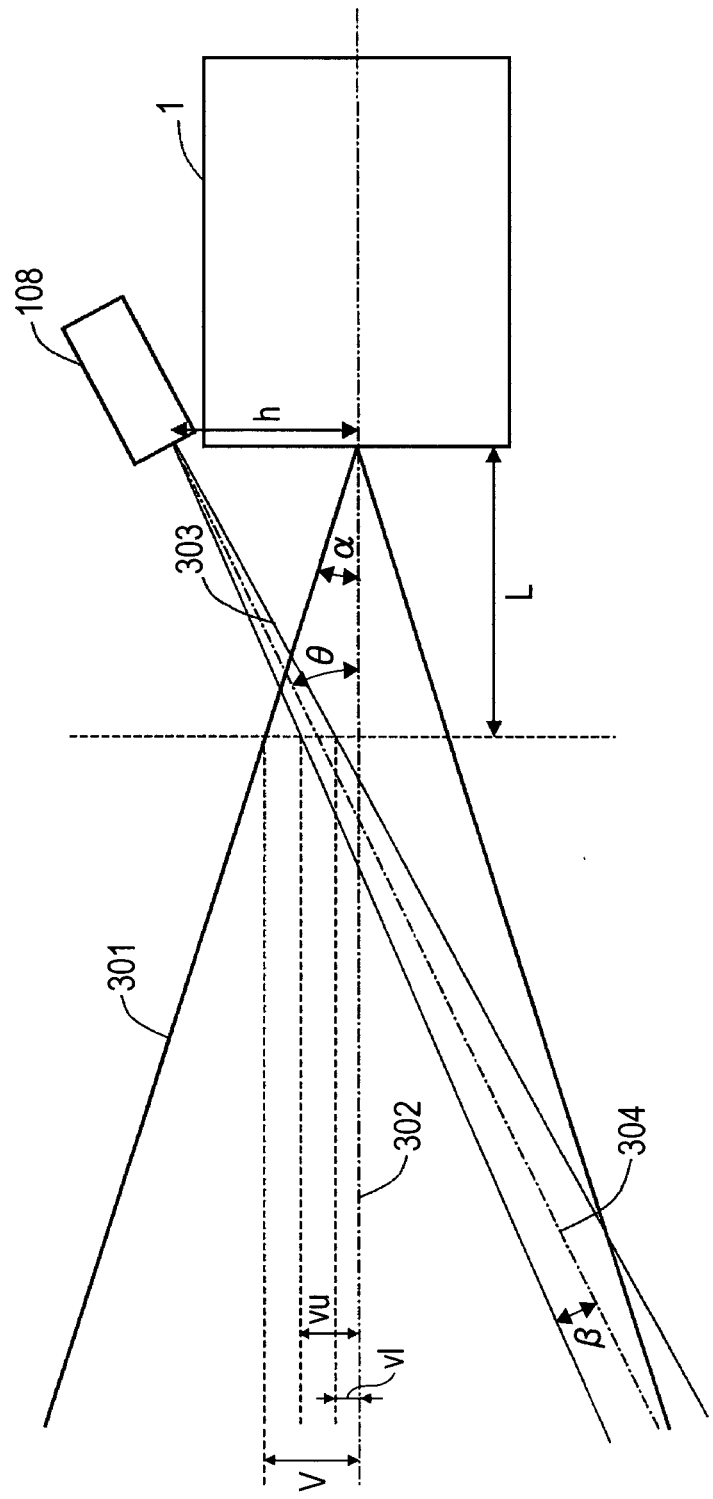
FIG. 11 is a conceptual diagram illustrating an angle of field of a lens apparatus and the angle of field of the distance measuring sensor.

FIG. 11 is a diagram obtained by extracting, from the configuration of the image pickup apparatus, only the lens apparatus 1 and the distance measuring sensor 108, and illustrates an angle of field 301 and an optical axis 302 of the lens apparatus 1, an angle of field 303 and an optical axis 304 of the distance measuring sensor 108, a parallax distance h between the lens apparatus 1 and the distance measuring sensor 108, a half angle of field α of the lens apparatus 1, and a half angle of field β of the distance measuring sensor 108.

Further, at an arbitrary distance L from the lens apparatus 1, the half angle of field of the lens apparatus 1 is defined as V, a distance from the optical axis 302 of the lens apparatus 1 to the upper limit of the angle of field of the distance measuring sensor 108 is defined as vu, and a distance from the optical axis 302 of the lens apparatus 1 to the lower limit of the angle of field of the distance measuring sensor 108 is defined as vl.

A case where the optical axis 302 of the lens apparatus 1 intersects the optical axis 304 of the distance measuring sensor 108 with the angle θ is considered. V, vu and vl can be expressed by the following expressions, respectively.

$$V = L \times \tan \alpha \quad (9a)$$

$$vu = h - L \times \tan(\theta-\beta) \quad (9b)$$

$$vl = h - L \times \tan(\theta+\beta) \quad (9c)$$

Figure 12:
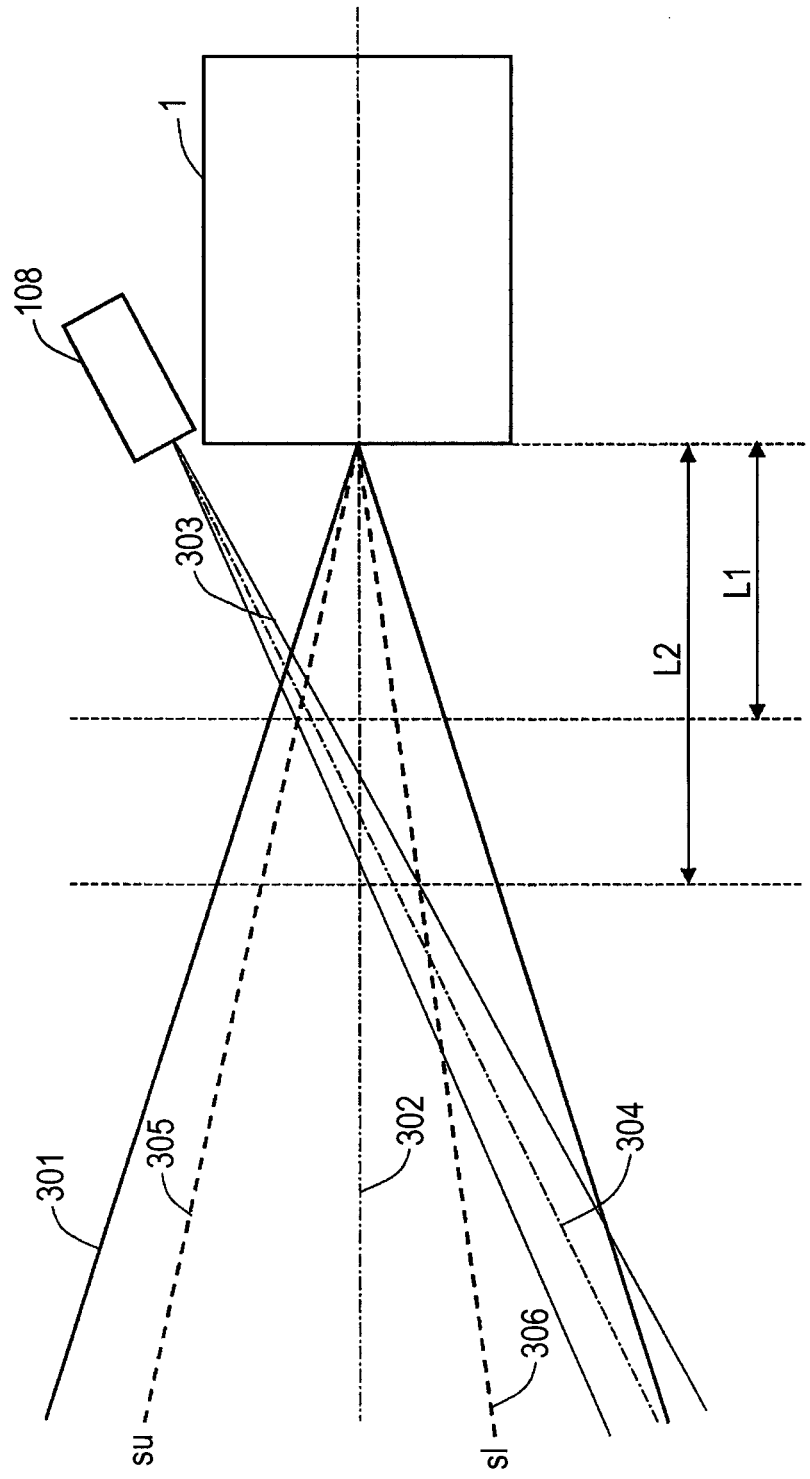
FIG. 12 is a conceptual diagram illustrating the angle of field of the lens apparatus and the angle of field of the distance measuring sensor.
Figure 13:
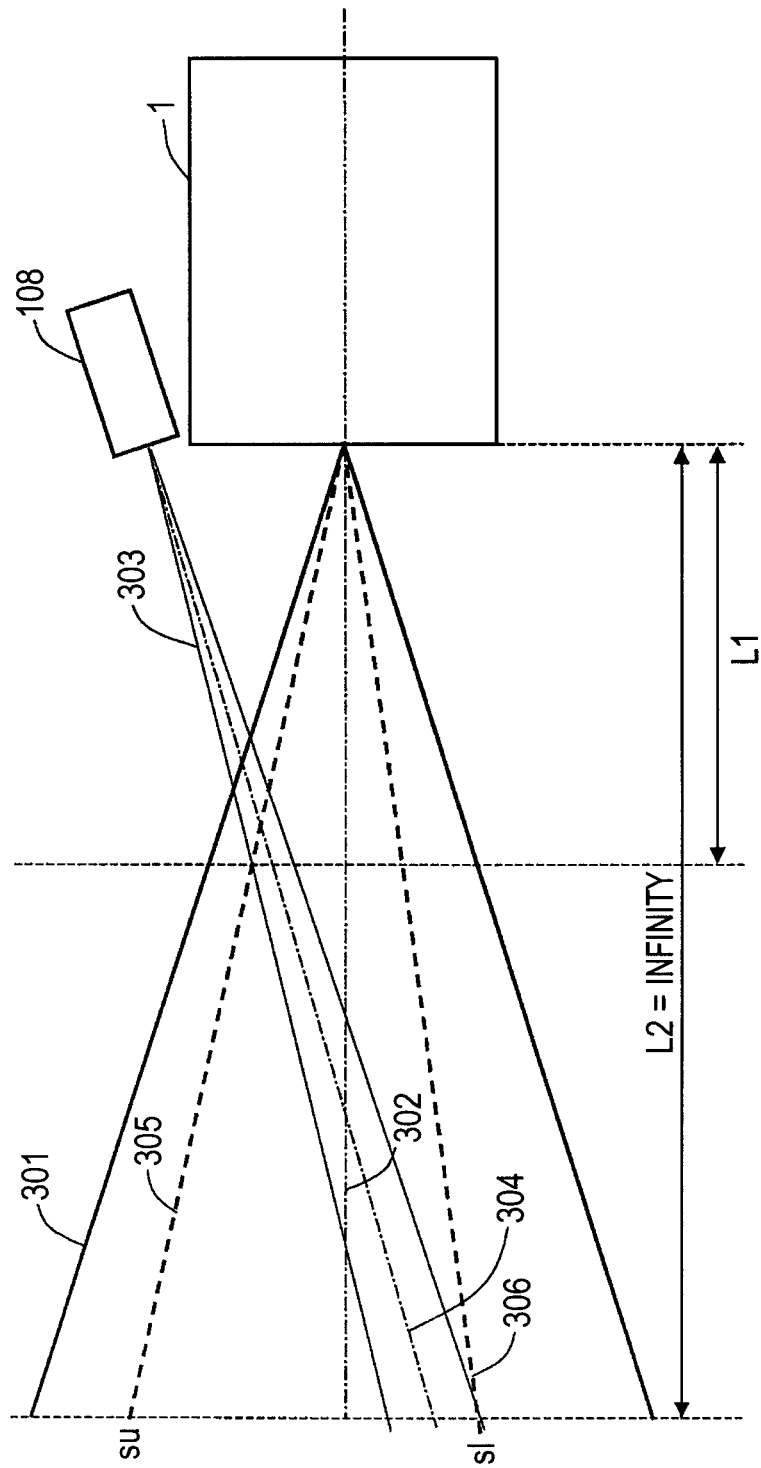
FIG. 13 is a conceptual diagram illustrating the angle of field of the lens apparatus and the angle of field of the distance measuring sensor.

FIG. 12 is a diagram in which the angle of field of the AF frame (between 305 and 306) is added to the angle of field 301 of the lens apparatus 1. Dashed lines 305 and 306 represent, in the optical axis plane including the optical axis of the lens apparatus 1 and the optical axis of the distance measuring sensor 108, the angles of field whose distances from the optical axis 302 of the lens apparatus 1 have the ratios su and sl, respectively, with respect to the half angle of field of the lens apparatus 1. Further, the angle of field 305 intersects the upper limit of the angle of field of the distance measuring sensor 108 at an object distance L1, and the angle of field 306 intersects the lower limit of the angle of field of the distance measuring sensor 108 at an object distance L2.

Based on the conditions described above, a focus range in which the angle of field of the distance measuring sensor 108 is included in the angle of field of the AF frame is calculated. Here, the angle of field of the AF frame exists in an area sandwiched between the angle of field 305 and the angle of field 306, with respect to the angle of field 301 of the lens apparatus 1, and hence the focus range in which the angle of field of the distance measuring sensor 108 is included in the AF frame is expressed by L2−L1. Referring also to FIG. 12, vu/V=su is established at L=L1. Accordingly, by solving Expression (9a) and Expression (9b) for L1, Expression (10a) is obtained. Similarly, vl/V=sl is established at L=L2. Accordingly, by solving Expression (9a) and Expression (9c) for L2, Expression (10b) is obtained.

$$L1 = h/(su \times \tan \alpha + \tan(\theta-\beta)) \quad (10a)$$

$$L2 = h/(sl \times \tan \alpha + \tan(\theta+\beta)) \quad (10b)$$

In order that the distance to an object can be measured with a wide focus range, θ needs to be determined so that L2−L1 becomes the largest. If θ is determined so that L2 becomes infinite as illustrated in FIG. 13, the above-mentioned condition is satisfied. Therefore, by solving Expression (11), $$sl \times \tan\alpha + \tan(\theta+\beta) = 0 \quad (11)$$

Expression (8a) can be obtained.

$$\tan(\theta+\beta) = -sl \times \tan\alpha \quad (8a)$$

That is, when the distance measuring sensor mount is disposed above the image pickup optical system, s used in Expression (8) should be sl. On the other hand, when the distance measuring sensor mount is disposed below the image pickup optical system, θ is determined according to the ratio of the upper limit position of the AF frame with respect to the position in the display of the VF 203 corresponding to the maximum image height, and thus s used in Expression (8) should be su.

Hereinabove, the case where the distance measuring sensor mount is disposed above the image pickup optical system is described, but the same control may be applied also in a case where the distance measuring sensor mount is disposed below or on the right or left hand side of the image pickup optical system.

In this embodiment, the description is given by assuming the distance measuring sensor to be a passive external distance measure type phase difference sensor, but the present invention is also applicable to active-type infrared triangulation for measuring distance. Further, as a unit for changing the optical axis direction of the distance measuring sensor 108, the distance measuring sensor mount 107 is used. However, the optical axis direction of the distance measuring sensor 108 may be optically changed, such as disposing a variable angle prism or a mirror in the optical system of the distance measuring sensor.

As in the configuration described above, by determining the angle between the optical axis of the distance measuring sensor and the optical axis of the lens apparatus appropriately according to the focal length of the image pickup optical system, a focus area in which the angle of field of the distance measuring sensor is included in the angle of field of the AF frame set by the camera operator is made wider, thereby enabling the distance to the object to be measured with a wider focus range.

Fifth Embodiment

Hereinafter, a fifth embodiment of the present invention is described with FIGS. 14 and 15.

Figure 14:
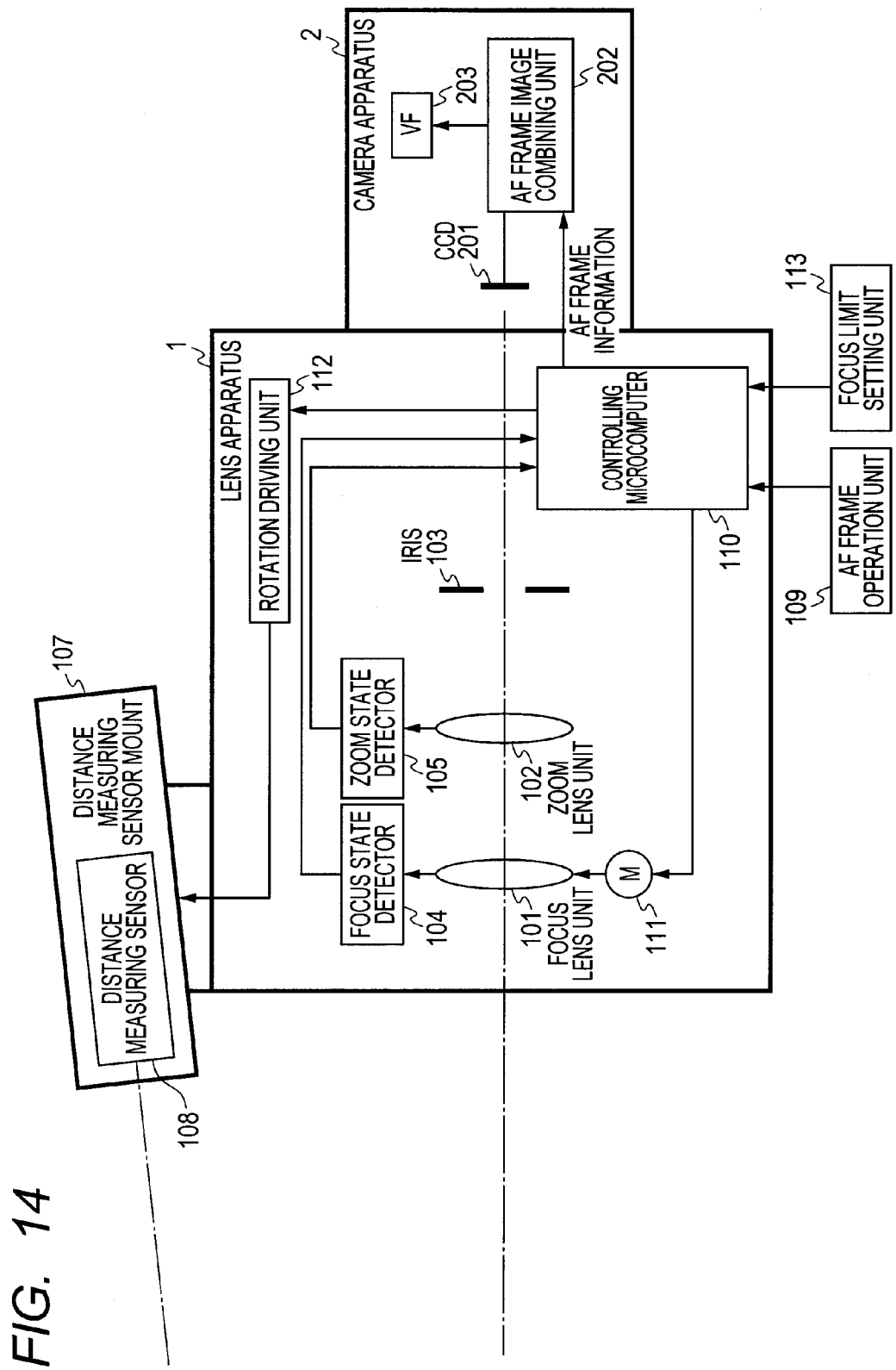
FIG. 14 is a schematic configuration according to a fifth embodiment.
Figure 15:
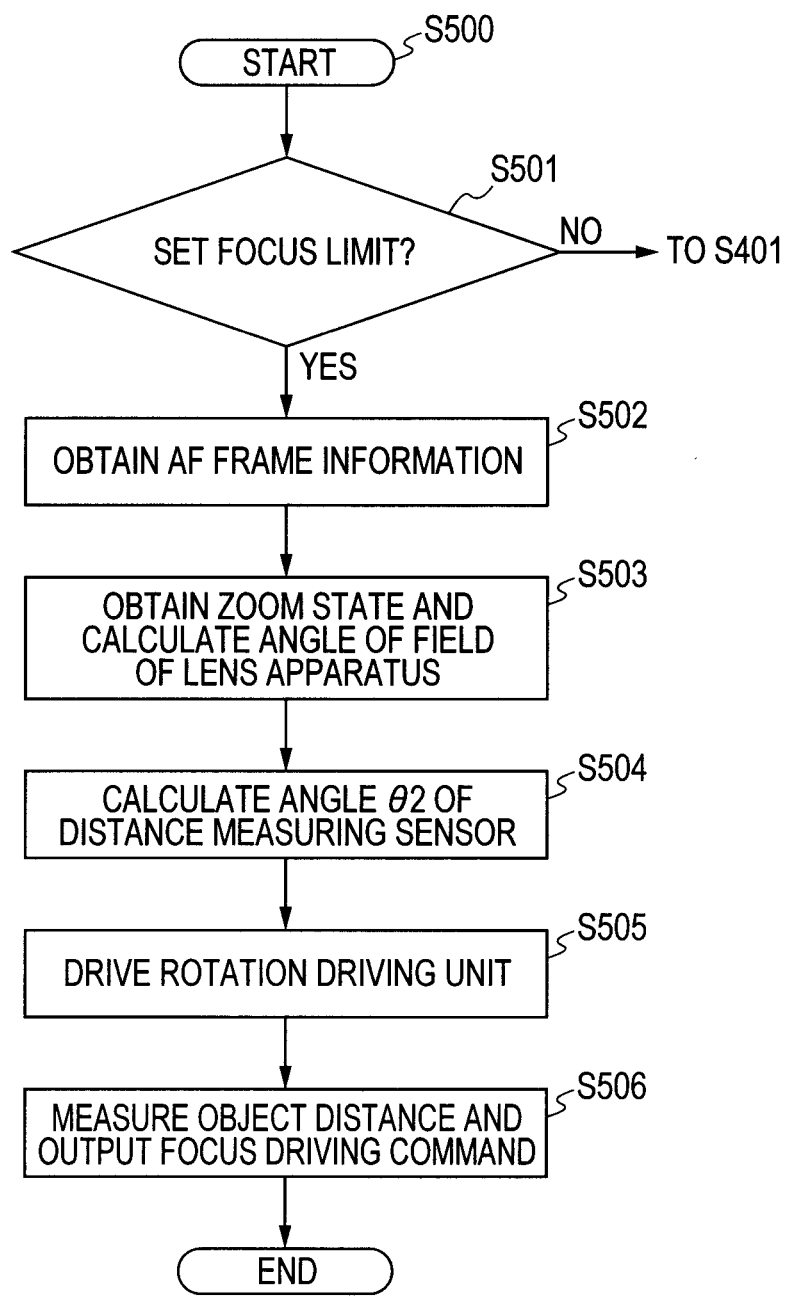
FIG. 15 is an operation flow chart according to the fifth embodiment.

FIG. 14 is a diagram illustrating a schematic configuration of an image pickup apparatus according to the fifth embodiment.

The configuration of this embodiment has a feature in that a focus limit setting unit 113 for setting an upper limit for an image-taking distance is further provided to the configuration of the fourth embodiment, and the other components are the same as those of the fourth embodiment illustrated in FIG. 8. FIG. 15 is a flow chart of processing performed by the controlling microcomputer 110, which represents a feature of the fifth embodiment of the present invention.

At first, in S501, it is determined whether or not the upper limit of the image-taking distance is set for the focus limit setting unit 113. When the upper limit of the image-taking distance is not set, the processing proceeds to S401 of the fourth embodiment. When the upper limit of the image-taking distance is set, the processing proceeds to S502. In S502, the lens apparatus 1 obtains the AF frame information from the controlling microcomputer 110.

Subsequently, in S503, the half angle of field of the lens apparatus 1 is calculated based on the zoom state information of the zoom state detector 105. An expression for the calculation is the same as Expression (7).

Subsequently, in S504, an angle formed between the optical axis of the distance measuring sensor 108 and the optical axis of the lens apparatus 1 is calculated based on Expression (12) below.

$$\tan(\theta 2+\beta) = h/FL - sl \times \tan\alpha \quad (12)$$

Expression (12) is obtained by substituting a focus limit for L2 in Expression (10b) and then transforming the resultant expression.

Note that, θ2 represents the angle formed between the optical axis of the distance measuring sensor 108 and the optical axis of the lens apparatus 1, FL represents the focus limit (the upper limit of the image-taking distance), and h represents the parallax distance between the lens apparatus 1 and the distance measuring sensor 108.

Further, in S505, a command is output to the rotation driving unit 112 so that the angle formed between the optical axis of the distance measuring sensor 108 and the optical axis of the lens apparatus 1 becomes θ2. In S506, the distance to an object is measured, and then, the measured distance is output as the focus driving command to the focus motor 111, thereby performing the focusing operation.

As in the configuration described above, by determining the angle between the optical axis of the distance measuring sensor and the optical axis of the lens apparatus appropriately according to the focal length of the image pickup optical system, the focus area in which the angle of field of the distance measuring sensor is included in the angle of field of the AF frame set by the camera operator is made wider on the close side relative to the focus limit. As a result, in an area on the close side relative to a desired focus limit, the distance to an object can be measured with a wider focus range.

Sixth Embodiment

Hereinafter, a sixth embodiment of the present invention is described with FIGS. 16 and 17.

Figure 16:
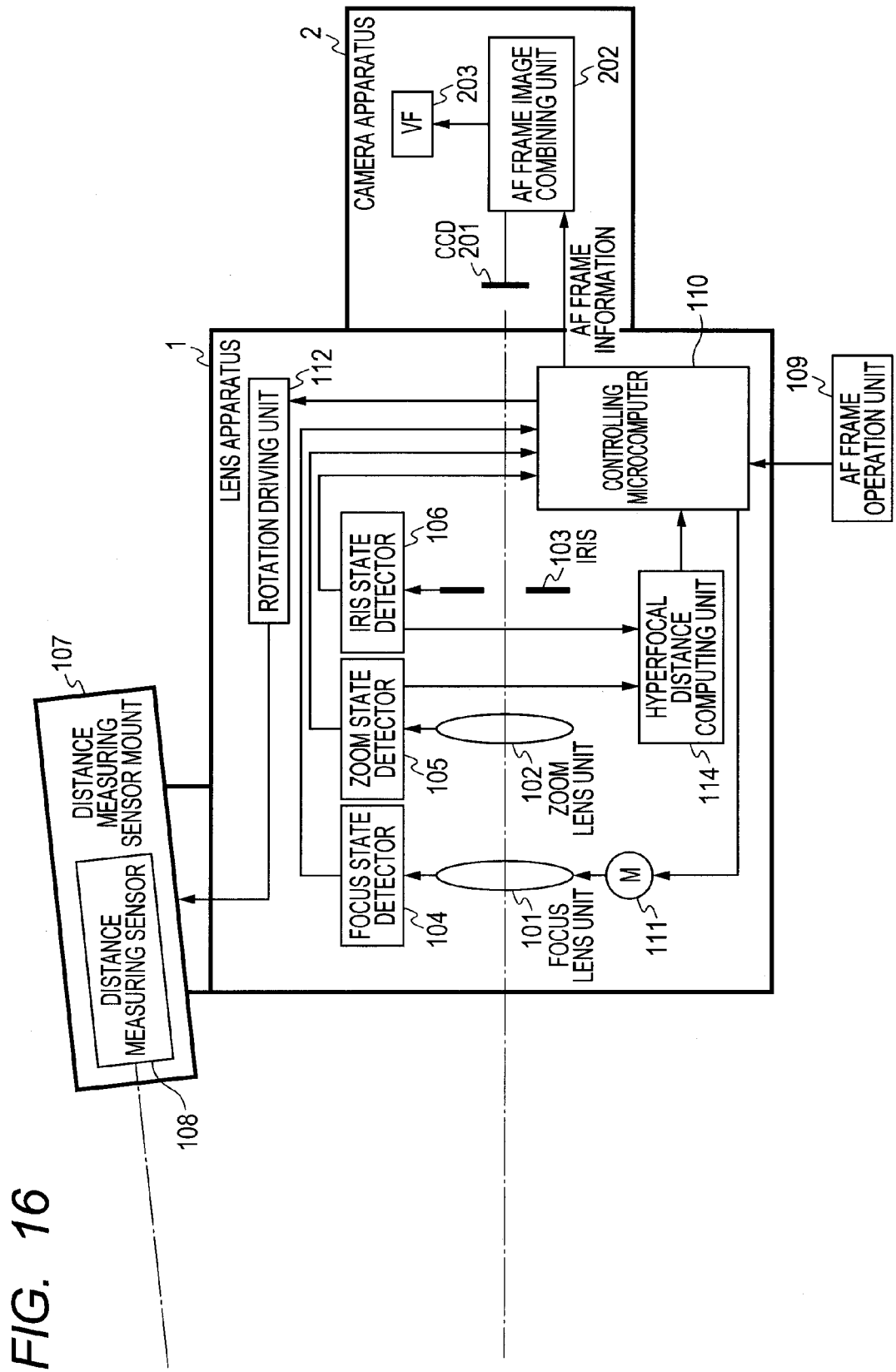
FIG. 16 is a schematic configuration according to a sixth embodiment.
Figure 17:
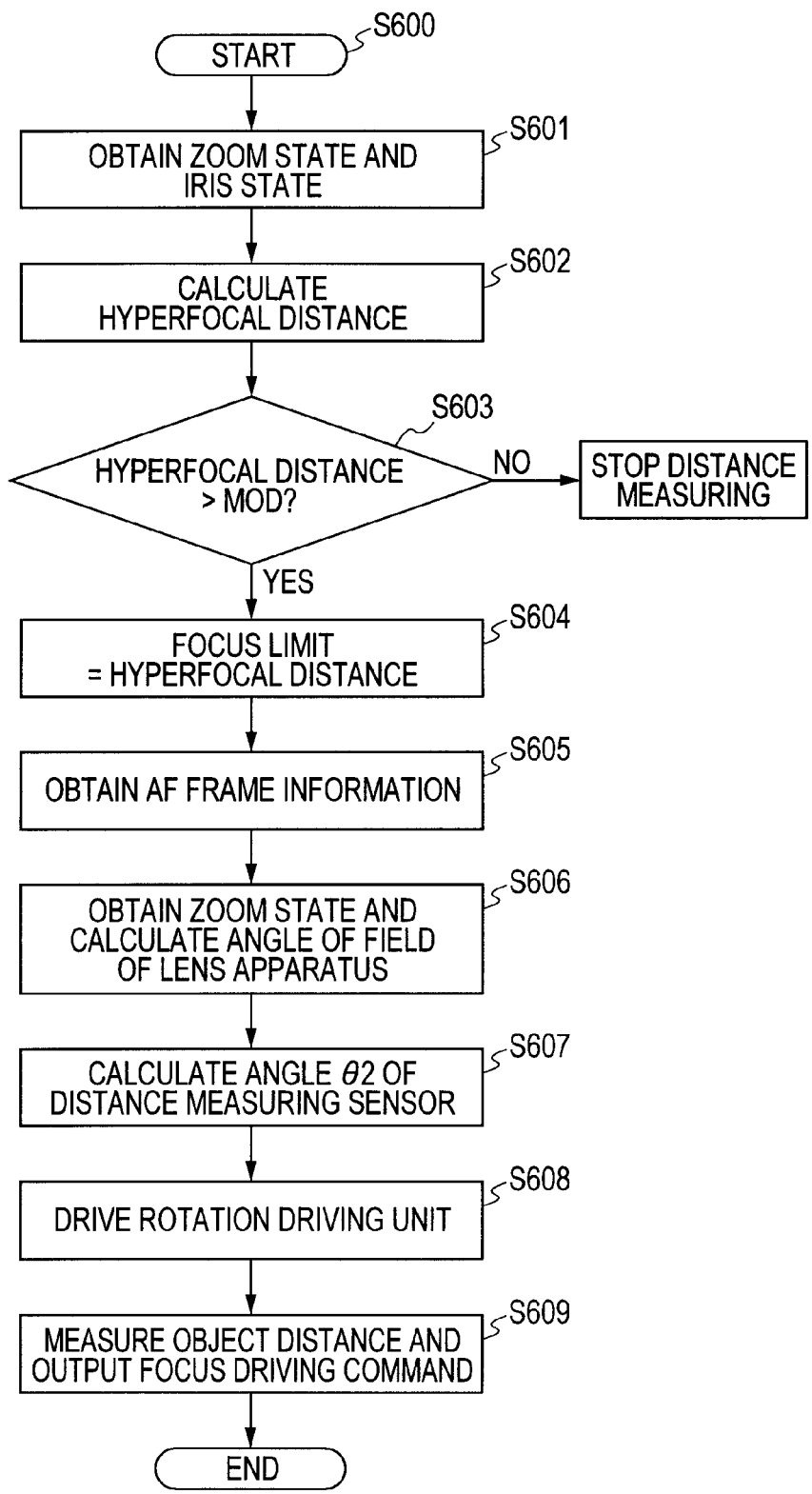
FIG. 17 is an operation flow chart according to the sixth embodiment.

FIG. 16 is a diagram illustrating a schematic configuration of an image pickup apparatus according to the sixth embodiment.

The configuration of this embodiment has a feature in that an iris state detector 106 for detecting an f-number of the iris mechanism 103 and a hyperfocal distance computing unit 114 for computing a hyperfocal distance of the lens apparatus 1 based on pieces of information of the zoom state detector 105 and the iris state detector 106 are further provided to the configuration of the fourth embodiment. The other components than the iris state detector 106 and the hyperfocal distance computing unit 114 are the same as those of the fourth embodiment illustrated in FIG. 8. FIG. 17 is a flow chart of processing performed by the controlling microcomputer 110, which represents a feature of the sixth embodiment of the present invention.

At first, in S601, pieces of information of the zoom state detector 105 and the iris state detector 106 are obtained. Subsequently, in S602, the hyperfocal distance computing unit 114 computes a hyperfocal distance H of the lens apparatus 1 based on Expression (13), $$H = f^2/(\delta \times FNo) \quad (13)$$

where δ represents a permissible circle of confusion, FNo represents the f-number, and f represents the focal length of the lens apparatus 1.

Subsequently, in S603, it is determined whether or not the hyperfocal distance computed in S602 is larger than a minimum object distance (MOD) of the lens apparatus 1. When the hyperfocal distance is smaller than the MOD, it is determined that the in-focus state is achieved over the entire focus range, and thus the distance measuring operation is stopped. When the hyperfocal distance is larger than the MOD, the processing proceeds to S604. In S604, the hyperfocal distance of the lens apparatus 1 is set as a focus limit.

Subsequently, in S605, the lens apparatus 1 obtains the AF frame information from the controlling microcomputer 110. In S606, the half angle of field of the lens apparatus 1 is calculated based on the zoom state information of the zoom state detector 105. An expression for the calculation is the same as Expression (7).

Subsequently, in S607, an angle θ2 formed between the optical axis of the distance measuring sensor 108 and the optical axis of the lens apparatus 1 is calculated by substituting the hyperfocal distance for the focus limit FL in Expression (12). Further, in S608, a command is output to the rotation driving unit 112 so that the angle formed between the optical axis of the distance measuring sensor 108 and the optical axis of the lens apparatus 1 becomes θ2. In S609, the distance to an object is measured, and then, the measured distance is output as the focus driving command to the focus motor 111, thereby performing the focusing operation.

As in the configuration described above, by determining the angle formed between the optical axis of the distance measuring sensor and the optical axis of the lens apparatus appropriately according to the focal length of the image pickup optical system, the focus area in which the angle of field of the distance measuring sensor is included in the angle of field of the AF frame set by the camera operator is made wider on the close side relative to the hyperfocal distance. As a result, the distance to an object can be measured with a wider focus range. Further, the distance measuring operation is stopped depending on the image-taking condition of the lens apparatus 1. Therefore, the distance measuring sensor mount 107 is not driven unnecessarily, and the distance measuring sensor 108 does not perform the distance measuring operation unnecessarily, with the result that power consumption of the distance measuring sensor mount 107 and the distance measuring sensor 108 can be suppressed.

Seventh Embodiment

Hereinafter, a seventh embodiment of the present invention is described.

In the fourth to sixth embodiments, the case where the optical axis direction of the distance measuring sensor 108 is changed continuously according to the change in zoom state of the lens apparatus 1 is described as an example. However, in this embodiment, the optical axis direction of the distance measuring sensor 108 is changed discretely based on information on the zoom state.

A schematic configuration of an image pickup apparatus according to the seventh embodiment is the same as that of the fourth embodiment. Note that, in this embodiment, a case where the optical axis direction of the distance measuring sensor 108 is changed in three steps according to the change in zoom state of the lens apparatus 1 is described.

Figure 18:
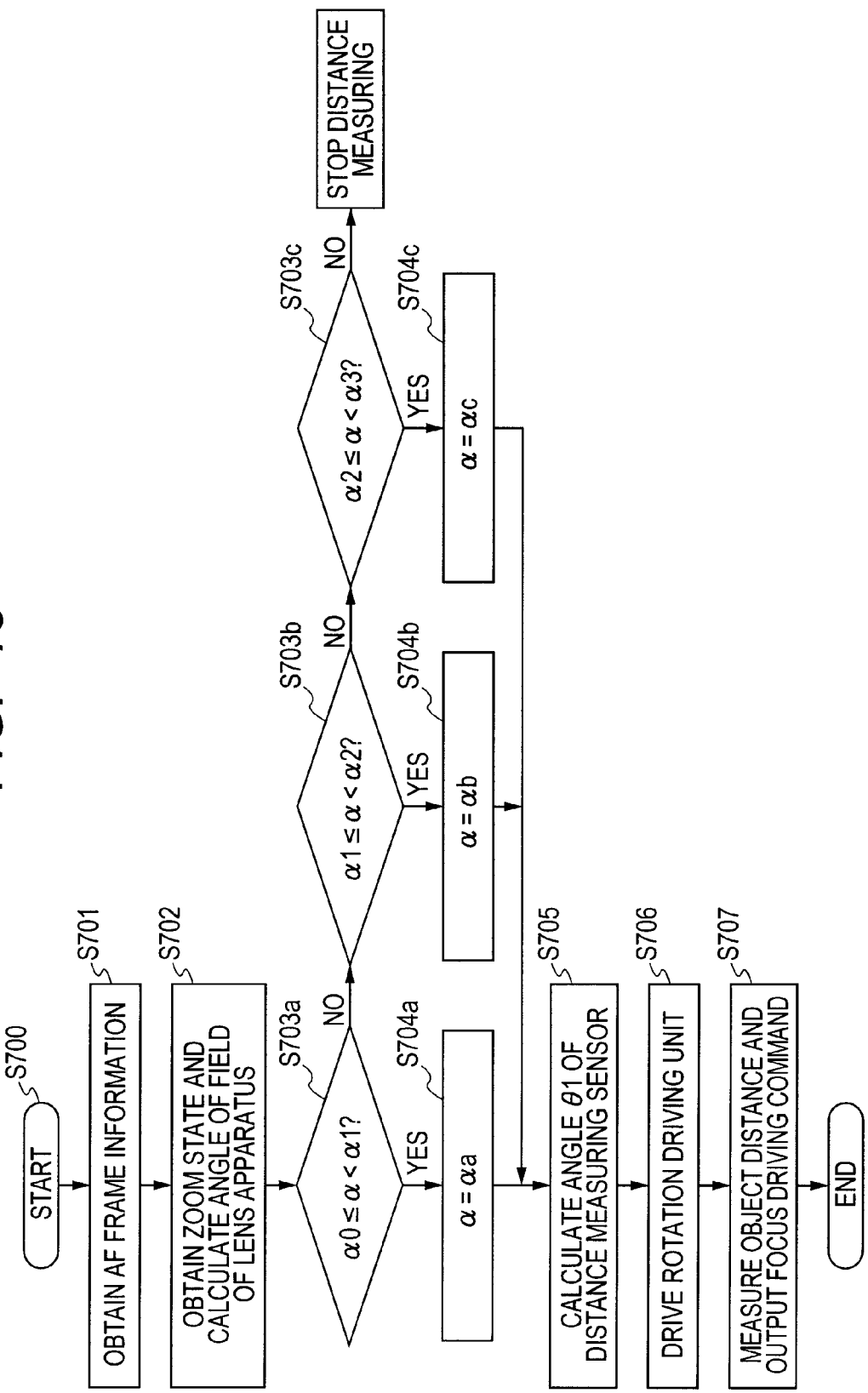
FIG. 18 is an operation flow chart according to a seventh embodiment.

FIG. 18 is a flow chart of processing performed by the controlling microcomputer 110, which represents a feature of the seventh embodiment of the present invention. At first, in S701, the lens apparatus 1 obtains the AF frame information from the controlling microcomputer 110. Subsequently, in S702, the half angle of field of the lens apparatus 1 is calculated based on the zoom state information of the zoom state detector 105 by using Expression (7).

Subsequently, in S703a, it is determined whether or not a half angle of field α of the lens apparatus 1 satisfies α0≤α<α1 with respect to predetermined values α0 and α1. When the half angle of field α satisfies α0≤α<α1, the processing proceeds to S704a, in which the half angle of field α is set to satisfy α=αa. When the half angle of field α does not satisfy α0≤α<α1, the processing proceeds to S703b. In S703b, it is determined whether or not the half angle of field α of the lens apparatus 1 satisfies α1≤α<α2 with respect to predetermined values α1 and α2. When the half angle of field α satisfies α1≤α<α2, the processing proceeds to S704b, in which the half angle of field α is set to satisfy α=αb. When the half angle of field α does not satisfy α1≤α<α2, the processing proceeds to S703c.

In S703c, it is determined whether or not the half angle of field α of the lens apparatus 1 satisfies α2≤α<α3 with respect to predetermined values α2 and α3. When the half angle of field α satisfies α2≤α<α3, the processing proceeds to S704c, in which the half angle of field α is set to satisfy α=αc. When the half angle of field α does not satisfy α2≤α<α3, the distance measuring operation is stopped. Note that, α° may be set as the half angle of field of the lens apparatus 1 at the telephoto end, and α3 may be set as the half angle of field of the lens apparatus 1 at the wide angle end. The predetermined values α1 and α2 may be set as dividing equally into three a difference between the half angle of field of the lens apparatus 1 at the telephoto end and the half angle of field of the lens apparatus 1 at the wide angle end. Alternatively, the predetermined values α1 and α2 may be set by assigning weights on the telephoto side. Note that, the following are satisfied.

$$\alpha 0 \leq \alpha a < \alpha 1, \alpha 1 \leq \alpha b < \alpha 2, \alpha 2 \leq \alpha c < \alpha 3 \quad (14)$$

Subsequently, in S705, αa, αb or αc set in S704a, S704b or S704c is substituted for a in Expression (8), and its corresponding value obtained when the half angle of field of the lens apparatus 1 is αa, αb or αc is substituted for s, thereby calculating an angle formed between the optical axis of the distance measuring sensor 108 and the optical axis of the lens apparatus 1. Further, in S706, a command is output to the rotation driving unit 112 so that the angle formed between the optical axis of the distance measuring sensor 108 and the optical axis of the lens apparatus 1 becomes θ. In S707, the distance to an object is measured, and then, the measured distance is output as the focus driving command to the focus motor 111, thereby performing the focusing.

To generalize this embodiment to give its summary, when the half angle of field α of the image pickup optical system satisfies the following expression:

$$\alpha(i) \leq \alpha < \alpha(i+1) \quad (15)$$

where α(i) represents a predetermined constant and i represents any integer, and the half angle of field α of the image pickup optical system is defined as $\alpha_{fix}(i)$ which satisfies the following expression:

$$\alpha(i) \leq \alpha_{fix}(i) < \alpha(i+1), \quad (16)$$

the angle θ formed between the optical axis of the image pickup optical system and the optical axis of the distance measuring sensor 108 is set so as to satisfy the following expression:

$$\tan(\theta + \beta) = -s \times \tan \alpha_{fix}(i) \quad (17)$$

where β represents the half angle of field of the distance measuring sensor 108, and s represents, in the optical axis plane, the ratio representing the boundary position of the AF frame with respect to a position in the display of the VF 203 corresponding to the maximum image height. Then, the rotation driving unit 112 is driven to change the optical axis direction of the distance measuring sensor 108.

Note that, also in the case where the upper limit of the image-taking distance is set by the focus limit setting unit 113 as described in the fifth embodiment, the same concept as that of the above-mentioned processing flow is applicable to the change in half angle of field of the image pickup optical system (the case where the zoom lens unit is operated). In this case, the following expression is applied instead of Expression (17).

$$\tan(\theta+\beta)=h/FL-s\times\tan\alpha_{fix}(i) \tag{18}$$

where h represents the parallax distance between the image pickup optical system and the distance measuring sensor 108, and FL represents the upper limit of the image-taking distance which is set by the focus limit setting unit 113.

In contrast to the fourth to sixth embodiments in which the optical axis direction of the distance measuring sensor 108 is changed continuously according to the change in zoom state, this embodiment has a feature in that, when the zoom state (the half angle of field of the lens apparatus) falls within a predetermined range, the optical axis direction of the distance measuring sensor 108 is not changed continuously according to the change in zoom state (the half angle of field of the lens apparatus), but the optical axis direction of the distance measuring sensor 108 is changed only when a change exceeding the predetermined range occurs.

As in the configuration described above, by changing the angle between the optical axis of the distance measuring sensor and the optical axis of the lens apparatus discretely according to the focal length of the image pickup optical system, the focus area in which the angle of field of the distance measuring sensor is included in the angle of field of the AF frame set by the camera operator is made wider. As a result, the distance to an object can be measured with a wider focus range. Further, in a given zoom area, even when the zoom state is changed, the object distance measurement is performed without changing the optical axis direction of the distance measuring sensor, and hence the focusing can be performed in a shorter period of time.

In this embodiment, the case where the optical axis direction of the distance measuring sensor 108 is changed in three steps according to the change in zoom state of the lens apparatus 1 is described. However, the present invention is not limited to the change in three steps.

Further, such a configuration may be employed that the focus limit is set to the hyperfocal distance of the image pickup optical system as in the sixth embodiment.

Note that, in the description of the embodiments described above, for the simplification of the description, the case where the optical axis of the distance measuring sensor and the optical axis of the image pickup optical system exist in the same plane is described as an example. However, the present invention is not limited thereto, and it is to be understood that the effects of the present invention can be provided even in a case where the optical axis of the distance measuring sensor and the optical axis of the image pickup optical system do not exist in the same plane. Specifically, the effects of the present invention can be provided for such change in optical axis direction of the distance measuring sensor that an overlapping portion between the angle of field of the distance measuring sensor and the angle of field of the image pickup optical system of the lens apparatus is changed toward the close side or toward the infinity side. For example, in the case where the optical axis of the distance measuring sensor and the optical axis of the image pickup optical system do not exist in the same plane, the optical axis of the distance measuring sensor may be projected onto such a plane that includes the optical axis of the image taking optical system and is parallel to a plane in which the change of the optical axis direction of the distance measuring sensor is performed, and the above-mentioned relational expressions may be applied to the projected optical axis of the distance measuring sensor and the optical axis of the image taking optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-119306, filed May 25, 2010, and 2010-125496, filed Jun. 1, 2010, which are hereby incorporated by reference herein in their entirety.

What is claimed is:

1. An image pickup apparatus comprising:
  a lens apparatus having:
    an image pickup optical system including a focus lens unit and a zoom lens unit;
    a zoom state detector that detects a position of the zoom lens unit; and
    a controller that controls driving of the image pickup optical system;
  a camera apparatus having:
    a light receiving unit that receives a beam from the image pickup optical system; and
    an image display unit that displays image information obtained by the light receiving unit;
    an AF frame operation unit that sets, as an AF frame, a range for performing focusing in a display of the image display unit; and
  a distance measuring unit installed with a parallax with respect to an optical axis of the image pickup optical system and that measures a distance to an object,
  wherein the distance measuring unit includes a distance measuring direction changing unit that changes an optical axis direction of the distance measuring unit, and
  wherein the controller is configured to, for measuring the distance to the object in the angle of field of the AF frame:
    control the distance measuring direction changing unit to change the optical axis direction of the distance measuring unit based on the position of the zoom lens unit detected by the zoom state detector, the position and a size of the AF frame, and an angle of field of the distance measuring unit;
    select, from among measured distances obtained by the distance measuring unit, a measured distance obtained in an angle of field of the AF frame, based on the position of the zoom lens unit and the position of the AF frame; and
    perform the focusing by driving the focus lens unit based on the selected measured distance.

2. An image pickup apparatus according to claim 1, wherein the distance measuring direction changing unit changes the optical axis direction of the distance measuring unit so that an overlapping area, in which the angle of field of the distance measuring unit and the angle of field of the AF frame overlap each other, is changed from a close side of the image pickup apparatus toward an infinity side thereof.

3. An image pickup apparatus according to claim 1, wherein:
the lens apparatus further comprises:
a focus position detector that detects a position of the focus lens unit; and
an object distance calculating unit that calculates an object distance at which an in-focus state is achieved, based on the position of the focus lens unit detected by the focus position detector, and
the controller causes the distance measuring direction changing unit to change the optical axis direction of the distance measuring unit so that an overlapping area, in which the angle of field of the distance measuring unit and the angle of field of the AF frame overlap each other, includes the object distance calculated by the object distance calculating unit, to set an initial position of the optical axis direction from which the distance measuring unit starts distance measurement.

4. An image pickup apparatus according to claim 1, wherein the controller avoids changing the optical axis direction of the distance measuring unit while the position and the size of the AF frame are changed through an operation of the AF frame operation unit.

5. An image pickup apparatus according to claim 1, wherein the distance measuring direction changing unit changes the optical axis direction of the distance measuring unit by mechanically driving the distance measuring unit.

6. An image pickup apparatus according to claim 1, wherein the distance measuring direction changing unit changes the optical axis direction of the distance measuring unit by optically driving the distance measuring unit.

7. An image pickup apparatus according to claim 2, wherein the distance measuring direction changing unit changes the optical axis direction of the distance measuring unit so that the overlapping area, in which the angle of field of the distance measuring unit and the angle of field of the AF frame overlap each other, is changed from an area in the angle of field of the AF frame, which includes an MOD of the image pickup apparatus, toward the infinity side.

8. An image pickup apparatus according to claim 2, wherein, when a measured distance exists in the overlapping area, the controller causes the distance measuring direction changing unit to stop changing the optical axis direction of the distance measuring unit, and performs the focusing by driving the focus lens unit based on the measured distance.

9. An image pickup apparatus according to claim 7, wherein, when a measured distance exists in the overlapping area, the controller causes the distance measuring direction changing unit to stop changing the optical axis direction of the distance measuring unit, and performs the focusing by driving the focus lens unit based on the measured distance.

10. An image pickup apparatus according to claim 8, wherein the controller is further configured to:
perform the focusing by driving the focus lens unit based on the measured distance obtained by the distance measuring unit;
cause the distance measuring direction changing unit to change the optical axis direction of the distance measuring unit toward a direction of the object for which the measured distance is obtained; and
avoid changing the optical axis direction of the distance measuring unit while the distance measuring unit obtains the measured distance.

11. An image pickup apparatus according to claim 9, wherein the controller is further configured to:
perform the focusing by driving the focus lens unit based on the measured distance obtained by the distance measuring unit;
cause the distance measuring direction changing unit to change the optical axis direction of the distance measuring unit toward a direction of the object for which the measured distance is obtained; and
avoid changing the optical axis direction of the distance measuring unit while the distance measuring unit obtains the measured distance.

* * * * *